(12) United States Patent
Walters et al.

(10) Patent No.: US 9,172,747 B2
(45) Date of Patent: Oct. 27, 2015

(54) SYSTEM AND METHODS FOR VIRTUAL ASSISTANT NETWORKS

(71) Applicant: Artificial Solutions Iberia SL, Barcelona (ES)

(72) Inventors: Gareth Walters, Newbury (GB); Ebba Gustavii, Stockholm (SE); Rebecca Jonsson, Barcelona (ES); Andreas Wieweg, Stockholm (SE); Sonja Petrovic-Lundberg, Saltsjöbaden (SE); David Hjelm, Bagarmossen (SE)

(73) Assignee: Artificial Solutions Iberia SL, Barcelona (ES)

( * ) Notice: Subject to any disclaimer, the term of this patent is extended or adjusted under 35 U.S.C. 154(b) by 0 days.

(21) Appl. No.: 14/242,868

(22) Filed: Apr. 2, 2014

(65) Prior Publication Data

US 2014/0244712 A1 Aug. 28, 2014

Related U.S. Application Data

(63) Continuation of application No. 14/184,697, filed on Feb. 19, 2014.

(60) Provisional application No. 61/769,191, filed on Feb. 25, 2013.

(51) Int. Cl.
*H04L 29/08* (2006.01)
*G06N 5/00* (2006.01)

(52) U.S. Cl.
CPC . *H04L 67/10* (2013.01); *G06N 5/00* (2013.01)

(58) Field of Classification Search
None
See application file for complete search history.

(56) References Cited

U.S. PATENT DOCUMENTS

| | | | |
|---|---|---|---|
| 6,102,969 A * | 8/2000 | Christianson et al. | 717/146 |
| 2012/0015733 A1* | 1/2012 | Carroll et al. | 463/40 |
| 2013/0227564 A1* | 8/2013 | Asayama | 718/1 |
| 2013/0304758 A1* | 11/2013 | Gruber et al. | 707/769 |

* cited by examiner

*Primary Examiner* — Kakali Chaki
*Assistant Examiner* — Michael Zidanic
(74) *Attorney, Agent, or Firm* — Galvin Patent Law LLC; Brian R. Galvin

(57) ABSTRACT

A system for the operation of a virtual assistant network, comprising a plurality of virtual assistants stored and operating on network-connected devices, and a plurality of virtual assistant brokers stored and operating on network-connected devices, wherein the virtual assistants receive user requests and send the requests to the virtual assistant brokers, and wherein the virtual assistant brokers delegate the requests to other virtual assistants for fulfillment.

6 Claims, 17 Drawing Sheets

SYSTEM AND METHODS FOR VIRTUAL ASSISTANT NETWORKS

CROSS-REFERENCE TO RELATED APPLICATIONS

The instant application is a continuation of U.S. patent application Ser. No. 14/184,697, titled "SYSTEM AND METHODS FOR VIRTUAL ASSISTANT NETWORKS", filed on Feb. 19, 2014, which claims priority to U.S. provisional patent application Ser. No. 61/769,191, titled "SYSTEM AND METHODS FOR A NETWORK OF VIRTUAL ASSISTANTS", filed on Feb. 25, 2013, the entire specification of which is hereby incorporated by reference.

BACKGROUND OF THE INVENTION

1. Field of the Invention

The invention relates to the field of artificial intelligence, and more particularly to the field of natural language interaction-based applications, such as virtual assistants.

2. Discussion of the State of the Art

Virtual assistants are an example of a class of software applications, referred to herein as natural language interaction applications that use natural language to interact with a human user. With respect to virtual assistants in particular, these applications perform functions similar to those provided by human assistants, in that they can engage in conversations with their users in order to for example provide information, carry out routine tasks, or perform other operations as required. Many virtual assistants have been used in association with web sites, with these virtual assistants often featuring the use of graphical images or avatars to simulate the experience of interacting with a human being.

While some natural language interaction applications known in the art may possess rudimentary natural language understanding capabilities, in reality most such applications, and particularly most virtual assistants known in the art, are tightly scripted applications that carry out a limited range of activities. While scripted agents have proven useful in many online scenarios, their acceptance has generally been limited because, when users are restricted in their ways of expressing themselves in natural language, the communication language is not natural. Any notion of the virtual assistant's behaving like a real assistant disappears because too much effort is demanded of the user when the user is expected to know precisely what to say or what to do in order to achieve her goals. Thus there is a distinct need in the art for interpreting fluid and freely expressed natural language in various applications, for example by virtual assistants. This challenge is exacerbated by the fact that, even when equipped with rudimentary natural language interpretation, natural language interaction applications such as virtual assistants that seem to only "know" a small number of facts and who only "talk about" a very limited range of subjects (such as appointment management) do not seem very realistic to humans, who are used to being able to say things in a fluid way, shifting subjects easily and intermixing casual banter with task-oriented speech.

The use of natural language interaction applications generally, and virtual assistants more particularly, has also been hampered by the high degree of complexity and cost associated with developing and deploying virtual assistants, particularly those that have any significant degree of natural language interpretation and interaction capability. As such many of the services used by virtual assistants are housed in the cloud and are connected to using a network such as the internet, a corporate intranet, Bluetooth and other networks. Maintaining a connection to these services is necessary to completing many tasks of virtual assistants. However, given that in the current environment, there are many areas where connectivity is not available or expensive due to, for example, roaming charges or networks requiring a subscription, connectivity to other services may not always be available. Moreover, since typical users have a plurality of devices, maintaining consistency across devices is essential.

Accordingly, what is needed in the art is a system and various methods that enable virtual assistants to operate in a networked fashion with one another, facilitating interaction between virtual assistants as well as the management of a virtual assistant network for efficient task handling.

SUMMARY OF THE INVENTION

Accordingly, the inventor has conceived and reduced to practice, in a preferred embodiment of the invention, various systems and methods for the implementation and operation of virtual assistant networks, including the use of a virtual assistant broker that may be used to manage a number of virtual assistants in a networked fashion.

According to a preferred embodiment of the invention, a system for operating a virtual assistant network (VAN), comprising a plurality of virtual assistants (VAs) such as, for example, SIRI™ or other virtual personal assistants, or other assistive products or services, a plurality of VA brokers (that may be stored and operating on network-connected electronic devices), and a VA communication protocol (such as a standardized markup language or other means of standardizing communication between virtual assistants and brokers), is disclosed. According to the embodiment, VAs may be connected to and in communication with one another (as well as with brokers and human users) via the Internet or another communication network, such as a cellular data network or any other such appropriate means for electronic communication. A VA broker may be in communication with a plurality of VAs for such purposes as to receive requests or information as well as to send requests or other information to VAs, thereby facilitating a VAN by unifying communication between individual virtual assistants in an orderly fashion. For example, a virtual assistant may be assisting a user that is looking for a restaurant in a foreign country, and may send a request to a VA broker for information on local restaurants. The VA broker may then identify another virtual assistant in the network that may be able to process this request (for example, a virtual assistant maintained by a company in the country that is designed to assist local individuals in locating restaurants and placing reservations), and submit the request to that assistant on the user's behalf. The VA broker may then receive the result of the query (such as a list of nearby restaurants and their associated information), and send this back to the originating virtual assistant for presentation to the user. Alternatively, in some embodiments the broker assembles a list of virtual assistants that are likely to be able to satisfy a user's request that was submitted by the user's host virtual assistant, and send this list of possible virtual assistants back to the host virtual assistant. The host virtual assistant may then select one of the virtual assistants from the list provided by the broker and contact that virtual assistant with the request directly (typically, using contact information such as IP address that is provided by the broker with the list of eligible virtual assistants). In other embodiments, the host may exercise more direct control, selecting a virtual assistant and connecting the host virtual assistant to the selected virtual assistant, or even receiving responses to the user's request from a plurality of virtual assistants and returning either a list of responses (with or without information concerning which virtual assistant provided each response) or a single response selected by the broker. In this manner, a network of virtual assistants may be utilized to expand the functionality of any one particular assistant without any additional complication on the part of the user, who may perceive that they are consistently interacting with a single virtual assistant with which they may be familiar, while networked operation takes place "in the background" without their knowledge.

Further according to the embodiment, a VA communication protocol (such as, as envisioned by the inventor, a standardized markup language) may be utilized to facilitate interaction between virtual assistants and brokers. Ordinarily, each particular virtual assistant or broker may have a particular means of interaction, that may not be interchangeable with another. Such behavior is common practice in various corporate technologies in the art, where proprietary technologies may impede interaction between products or services from different vendors. By utilizing a standardized protocol, interaction between these disparate technologies may be facilitated in a structured and reliable manner, such that networking functionality and the use of brokers (that may need to interact with a large variety of different technologies to perform their functions) become possible according to the invention.

According to the embodiment, not all inter-VA communication may need to utilize a broker. For example, it is possible that a particular VA may already be familiar with another VA that is appropriate for a particular request. In such a scenario, a user may interact with their familiar VA that may serve as the "host" for the interaction. As needed, the host VA may communicate with a known "target" VA for assistance with specific requests. The target VA may then fulfill those requests as they would during normal operations (as if the requests had been received directly from a user), and return the results to the host VA for presentation to the user. In this manner, networked functionality may be provided by virtual assistants when no broker is available, or when it may be undesirable to utilize one (such as when the host VA already knows of a specific target VA that may be appropriate for the request).

Further according to the embodiment, a VA broker may communicate with another VA broker as necessary, such as to utilize virtual assistants outside of its own network. For example, a virtual assistant network (VAN) may be maintained for a specific region or country, encompassing a variety of virtual assistant technologies relevant to that specific locale. When a user submits a request for information from another region, such as asking for local news from another country, it may be possible that no particular VA within the network is ideal for handling the request. In this scenario, the originating "host" VA may decide to communicate with a VA broker for assistance in fulfilling the user's request. The VA broker may then reach out to another "target" broker for the specified region to pass the request to their network for handling, and in turn the target VA broker may submit the request to a local virtual assistant (as described previously) for handling. The results of that interaction may then be returned to the host VA for presenting to the user. In this use case, the user may still perceive that they are only interacting with their familiar virtual assistant, while all brokering operations take place without their knowledge.

In another preferred embodiment of invention, a method for providing networked virtual assistant operations is disclosed. According to the embodiment, a user may submit a request to a virtual assistant for fulfillment. According to the nature of the specific request, the VA may identify that another VA is needed to fulfill the request (or that utilizing another VA for assistance may further enhance the fulfillment of the request). The VA may then send a request to a VA broker for assistance, the broker then communicating with another target VA for fulfillment of the request. The results of the request may then be returned to the host VA for presentation to the user. Alternatively, in some embodiments the broker assembles a list of virtual assistants that are likely to be able to satisfy a user's request that was submitted by the user's host virtual assistant, and send this list of possible virtual assistants back to the host virtual assistant. The host virtual assistant may then select one of the virtual assistants from the list provided by the broker and contact that virtual assistant with the request directly (typically, using contact information such as IP address that is provided by the broker with the list of eligible virtual assistants). In other embodiments, the host may exercise more direct control, selecting a virtual assistant and connecting the host virtual assistant to the selected virtual assistant, or even receiving responses to the user's request from a plurality of virtual assistants and returning either a list of responses (with or without information concerning which virtual assistant provided each response) or a single response selected by the broker.

BRIEF DESCRIPTION OF THE DRAWING FIGURES

The accompanying drawings illustrate several embodiments of the invention, and together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION

Figure 1:
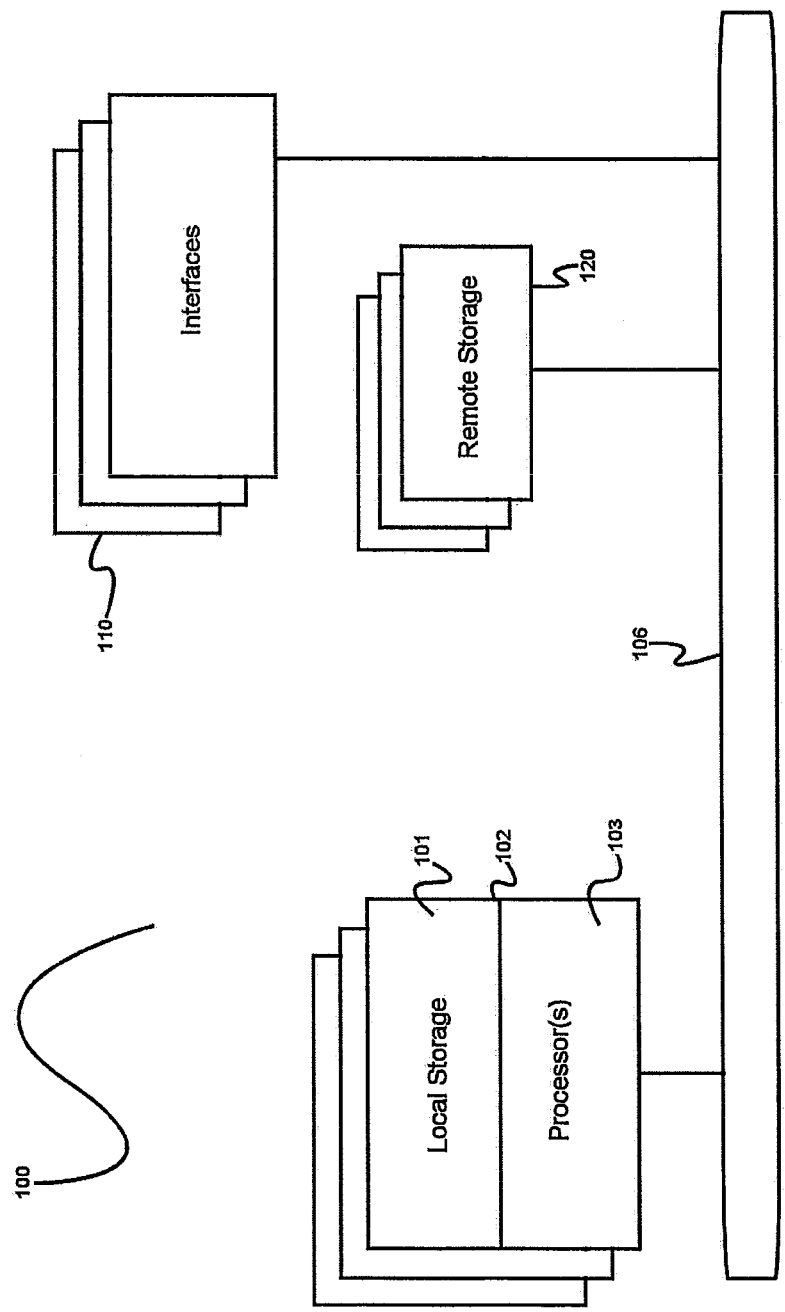
FIG. 1 is a block diagram illustrating an exemplary hardware architecture of a computing device used in an embodiment of the invention.

The inventor has conceived, and reduced to practice, various systems and methods for operating virtual assistant networks.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

DEFINITIONS

As used herein, "virtual assistant" means a software, hardware, or hybrid hardware/software application that provides assistance to humans analogous to that provided by human assistants, generally using an intuitive user interface, such as one that allows a user to express her needs in natural language.

As used herein, "natural language interpretation" means interpretation, by a machine, of one or a series of utterances made by a human user speaking or writing naturally; in some cases "natural language" may be supplemented by gestural, haptic, or other input combined with natural language input (for example, saying "move this here" while pointing or clicking on an object and a later a location). That is, a "natural language interpreter" generally does not require users to format their requests in simple, fixed patterns (such as a program might be required to do, as for example when invoking a web service or an application programming interface (API)).

As used herein, a "dialog" is a conversational exchange between two or more participants consisting of a generally unstructured sequence of natural language contributions in the form of requests, responses, statements and the like. A dialog is an interaction sequence that actually occurs (i.e., in run-time) during a conversation exchange between a user and a natural language system.

As used herein, a "flow" is a logical task unit comprising a set of related interaction steps required (and preconfigured) in order to perform a task. Typically a flow may comprise one or more transition conditions and operative nodes. A flow is typically defined in a natural language system as a series of predefined steps to perform when some triggering condition is satisfied.

As used herein, an "instructional path" is a sequence of instructions from one or more flows that were invoked or executed during the delivery of a dialog by a natural language system. In effect, an instructional path is the realization of one or more flows that occurs in an actual conversation (or dialog) between a user and a natural language system; it represents the sequence of decisions (or instructions) taken in support of natural language conversation (whereas the corresponding dialog is the actual sequence of what was "said" during the conversation by the parties involved, rather than why it was said).

As used herein, a "natural language interaction system" or a "natural language system" is a computer-based system capable of interacting via dialogs with one or more users using natural language (perhaps augmented by haptics, gestures, or other nonverbal means). Natural language systems carry out their function using dialogs, which can be thought of also as the actual, as executed, sequence of interaction steps between a user and a natural language system. A natural language system may participate in a dialog, by following the instructional steps of flows.

As used herein, a "language object" means an abstract representation of a logical unit of human linguistic expression that has meaning and is suitable for processing by automated systems such as virtual assistants. Language objects, in their simplest form, are represented as single words that represent a plurality of variants of a single common meaning, including inflectional variants and variants connected by synonymy. That is, generally a language object represents all variants and synonyms of the core word that represents it, and language objects may contain grammatical variants of words as well (such as verb tenses, contractions, and so forth).

As used herein, "script" means an executable sequence of instructions, generally stored (or at least rendered for execution) as plain text, which can be executed by an appropriate script interpreter. Scripts may be written in any scripting language known in the art, such as Perl, Python, PHP, Ruby, Groovy, and the like, or in any similar scripting language including proprietary scripting languages. As described variously herein, scripts generally are executed upon occurrence of specific events, such as initiation or termination of a user interaction session, or the triggering of a business rule such as "execute the following script if the number of active sessions exceed a configured number". Scripts can be nodes in flows (in which case they are referred to as "script nodes").

As used herein, "request" or "question" means a user-supplied or automatically supplied input to a natural language interaction-based system such as a virtual assistant, or to a virtual assistant broker.

As used herein, "response" means a system-supplied output from a natural language interaction system (as opposed to a user-supplied or automatically supplied input).

As used herein, "condition" means a rule or logical expression used for interpreting natural language utterances that, if satisfied, will allow for execution of one or more actions or will generate one or more effects. There are several types of conditions envisioned according to the invention, comprising for example: language recognition rules, skip conditions and transition conditions.

As used herein, a "language recognition rule" is a specific type of condition built up from language objects and used for capturing natural language expressions. For example, a language recognition rule can be used to interpret or capture the intention of a user request.

As used herein, "trigger" or a "flow trigger" is a construct which holds a condition, and which makes the system activate and start executing a flow if the condition is fulfilled.

As used herein, "listener" means is a rule construct with a conditional part and an operational part. When the conditional part is fulfilled, the operational part is invoked or executed, whereupon it updates current state based on information present in the current state and in the natural language input (the user request). Listeners may be configured to operate on a global level, on a flow level, or on a transition level, and they are generally evaluated in that order.

As used herein, "transition" or "transition condition" means a condition that determines whether the system should pass a transition to enter a new instructive step or process, a node (or a new transition). Transition may be input consuming (requires user input) or non-input consuming (does not require user input). Transitions may comprise one or more conditions and transitions can follow each other directly.

As used herein, "skip condition" means a condition that is verified prior to executing an instructive step (i.e., entering a node, for example of a flow). If the condition is met (e.g. some values have already been set previous in the system), the system will skip executing the instructional step and will continue as if it has already been executed.

As used herein, "small talk" means generally off-topic conversation elements that may be used to respond to user request. For example, if, during a flow devoted to making an airline reservation, a user asks "do you like to fly yourself?" a preprogrammed response (or a random or other selection from a plurality of possible responses) may be invoked which causes a response such as "I never fly myself, because I live in a machine!".

As used herein, "safety net" means a special flow type which is invoked when a user request fails to satisfy any condition (i.e., no matches were found); it is used to ensure that some form of response is made, after which generally the last active flow is resumed where it left off.

As used herein, an "example input" is a text sample that is used to describe, build, and test language recognition rules, triggers, and flows. Example inputs are typically obtained from text sample corpora, which are often obtained for example from logs of actual interactions between users and service representatives such as agents handling chat interactions or phone calls (which can be transcribed to generate example inputs). Typically, an example input (EI) will belong to at least one group of EIs that are related to a specific part of a natural language solution, such as a trigger and a language recognition rule (the trigger's condition). So an EI may "belong to" a specific trigger of a flow, and represents an example of what type of input should fulfill the language recognition rule of the trigger (in other words, the EI is assigned to a specific language recognition rule; often this occurs automatically because the language recognition rules was auto-generated from a set of example inputs, each of which is then assigned as a positive example input for the language recognition rule by default. Each language recognition rule (which can be linked to a trigger, language object, listener, internal flow transition or a skip condition) typically comprises four sets of assigned EIs: positive local EIs (that should match the language recognition rule when tested in isolation, but may not necessarily trigger it when tested in the context of the whole solution); negative local EIs (that should not match it); positive global EIs (that should both match and trigger it); and negative global EIs (that maybe could match it, but should never trigger it). Those sets may be empty. For example, example input "Insurance" may trigger a general language recognition rule; "Vehicle insurance" may fulfill a more specific language recognition rule; and "Car insurance" may trigger the most specific rule of the three. In this situation, the "car insurance" EI will always match the general "insurance" rule; a designer can solve the implied conflict here by setting an ordering relation that always evaluates the "car insurance" rule before the more general "insurance" rule. In that way, the more general rule is triggered only when the more specific condition isn't fulfilled. Alternatively, systems according to the invention may automatically identify conflicts (such as tangles) and propose a new ordering relation that may be reviewed by a developer.

As used herein, a "dialog hand-over" is when a component that is communicating to a user passes communication control to another component.

As used herein, a "host VA" is a virtual assistant that controls a dialog with a user. All communication with users typically goes via a host VA. In order to find a target VA (virtual assistant), the host may turn to a VA broker in a VA Network. The host may communicate with target VAs and VA brokers using a standardized inter-VA communication protocol. The host decides when to initiate a dialog with a target VA, when to forward a user's input to a target VA or a VA broker, and how to handle a response from a target VA or VA broker (e.g. display natural language response received from the target, respond to a request from the target). The host decides when to drop the dialog with a target. A host VA may also be registered in a VAN as a target VA.

As used herein a "target VA" is a virtual assistant that makes its knowledge available to a network or that performs tasks on behalf of users at the request of a network. The target VA needs to be capable of communicating with other VA's and VA brokers using the inter-VA communication protocol. The target VA informs a VA network of its areas of expertise via a VA Broker. A target may be available/registered in multiple networks.

As used herein a "VA broker" assists host VAs (and possibly other VA brokers) in finding suitable target VAs in VA networks. A VA broker may determine the best suitable target VAs based on various criteria, such as but not limited to the user's natural language input, statistical information about VA targets (user satisfaction, usage patterns etc), structured information provided by the host (user preferences, location details, language preferences). A VA broker may have a register of target VAs with their associated capabilities. Alternatively, in some embodiments the broker assembles a list of virtual assistants that are likely to be able to satisfy a user's request that was submitted by the user's host virtual assistant, and send this list of possible virtual assistants back to the host virtual assistant. The host virtual assistant may then select one of the virtual assistants from the list provided by the broker and contact that virtual assistant with the request directly (typically, using contact information such as IP address that is provided by the broker with the list of eligible virtual assistants). In other embodiments, the host may exercise more direct control, selecting a virtual assistant and connecting the host virtual assistant to the selected virtual assistant, or even receiving responses to the user's request from a plurality of virtual assistants and returning either a list of responses (with or without information concerning which virtual assistant provided each response) or a single response selected by the broker.

As used herein an "inter-VA communication protocol" is a standard protocol used by VAs and VA brokers to exchange information. The protocol makes it possible for VAs of different vendors, built using different technologies and targeted at different devices or interfaces, to exchange relevant data in a structured manner.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like). Moreover, in some embodiments one or more aspects, or all aspects, of the invention may optionally be implemented via a specially programmed chip (for instance, an application specific integrated circuit, or ASIC, or an erasable programmable read only memory, or EPROM), or via some other hardware-only approach known in the art.

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire™, PCI, parallel, radio frequency (RF), Bluetooth™ near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some in stances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
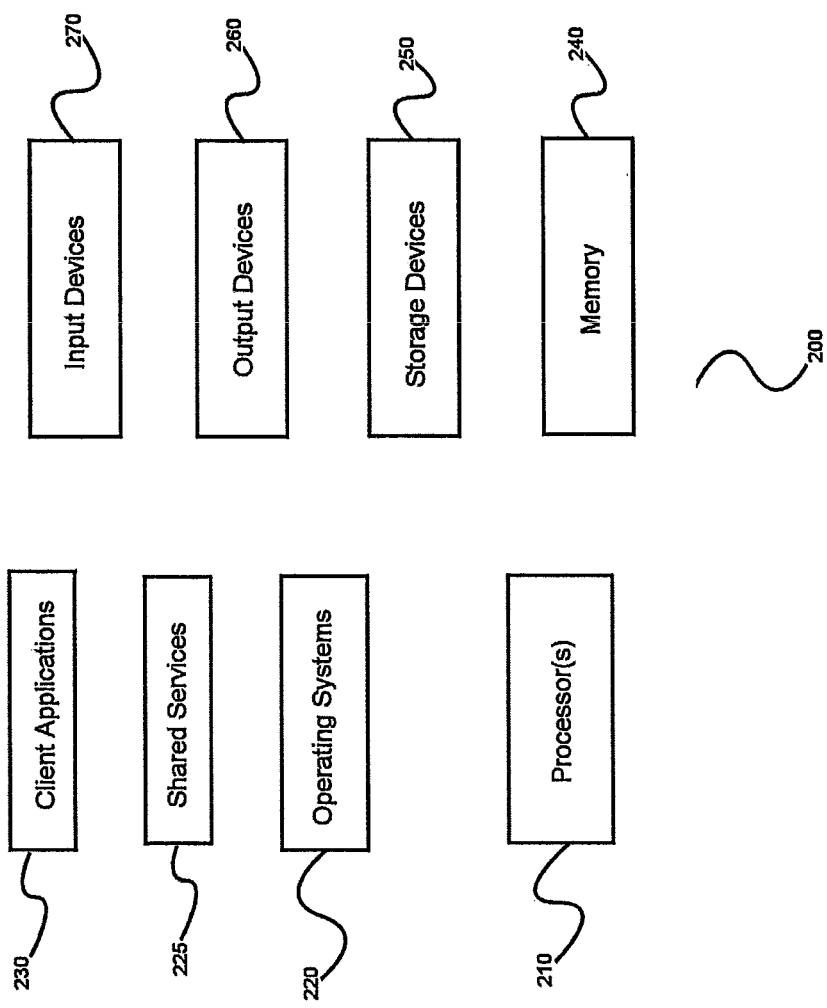
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's Windows™ operating system, Apple's Mac OS/X or iOS operating systems, some variety of the Linux operating system, Google's Android™ operating system, or the like. In many cases, one or more shared services 225 may be operable in system 200, and may be useful for providing common services to client applications 230. Services 225 may for example be Windows™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form. Examples of storage devices 250 include flash memory, magnetic hard drive, CD-ROM, and/or the like.

Figure 3:
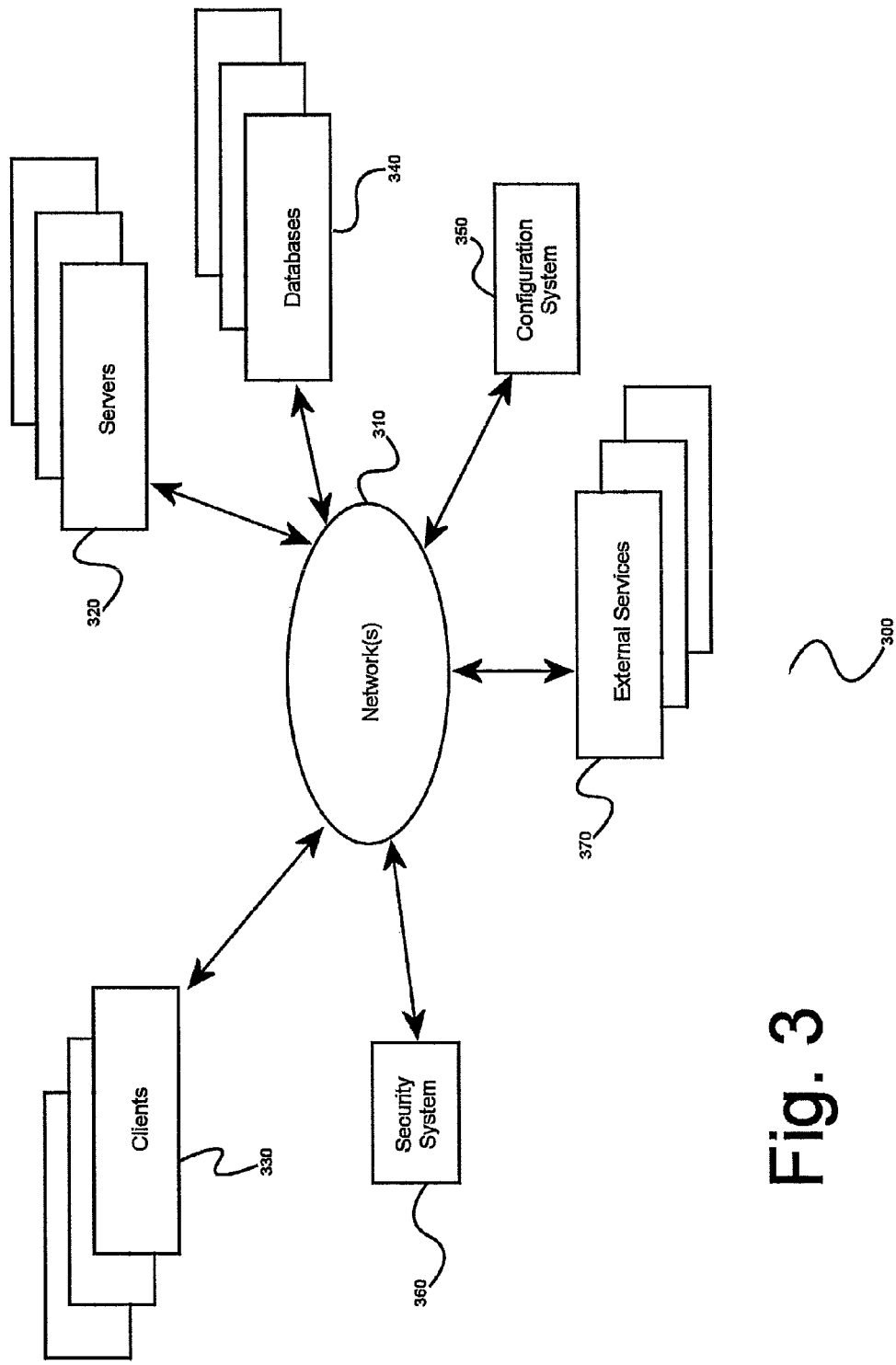
FIG. 3 is a block diagram illustrating an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network, a wireless network (such as WiFi, Wimax, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop, MapReduce, BigTable, and so forth). In some embodiments variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration 350 system or approach is specifically required by the description of any specific embodiment.

Figure 12:
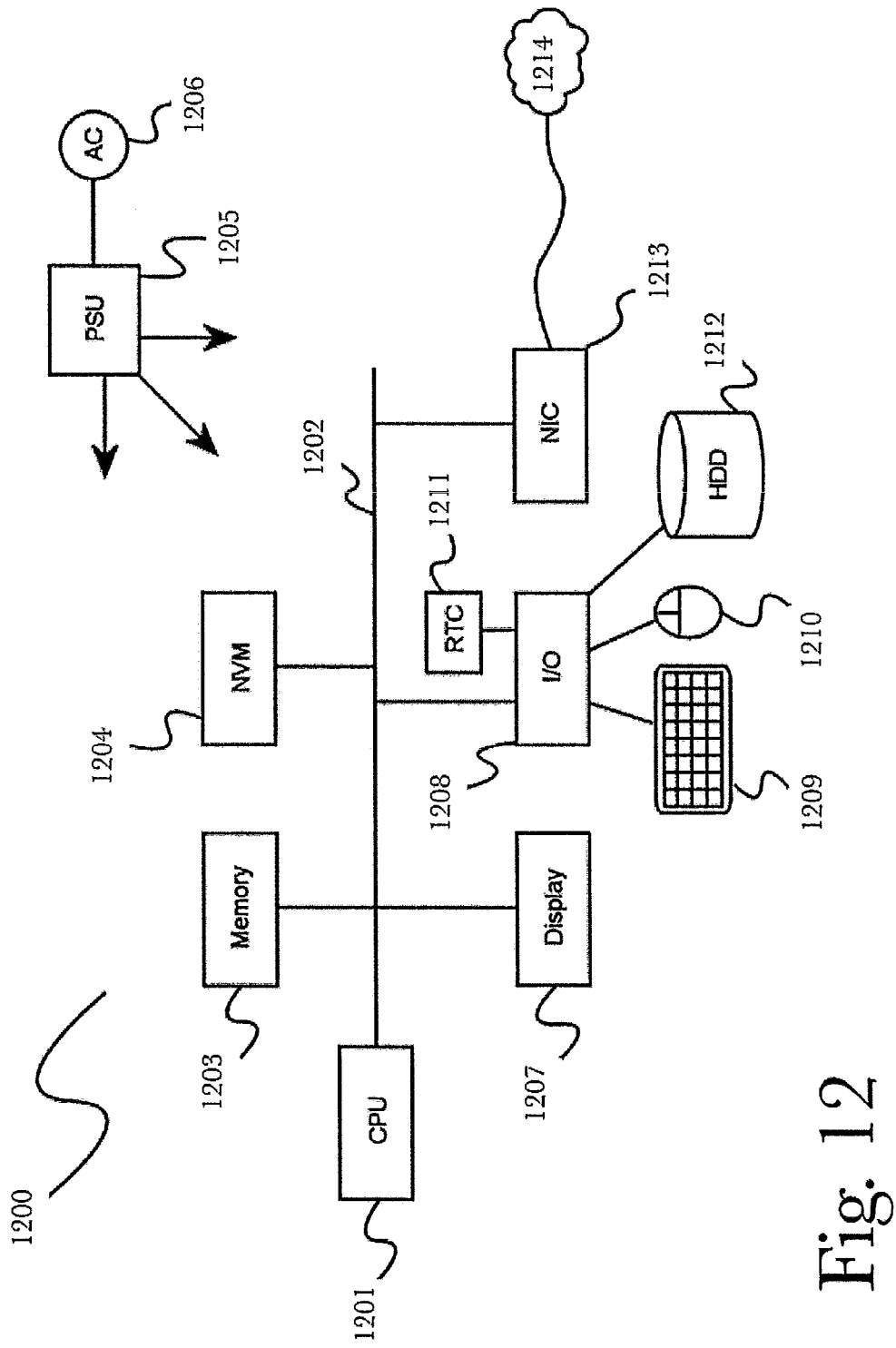
FIG. 12 is another block diagram illustrating an exemplary hardware architecture of a computing device used in various embodiments of the invention.

FIG. 12 shows an exemplary overview of a computer system 1200 as may be used in any of the various locations throughout the system. It is exemplary of any computer that may execute code to process data. Various modifications and changes may be made to computer system 1200 without departing from the broader spirit and scope of the system and method disclosed herein. CPU 1201 is connected to bus 1202, to which bus is also connected memory 1203, nonvolatile memory 1204, display 1207, I/O unit 1208, and network interface card (NIC) 1213. I/O unit 1208 may, typically, be connected to keyboard 1209, pointing device 1210, hard disk 1212, and real-time clock 1211. NIC 1213 connects to network 1214, which may be the Internet or a local network, which local network may or may not have connections to the Internet. Also shown as part of system 1200 is power supply unit 1205 connected, in this example, to ac supply 1206. Not shown are batteries that could be present, and many other devices and modifications that are well known but are not applicable to the specific novel functions of the current system and method disclosed herein.

In various embodiments, functionality for implementing systems or methods of the present invention may be distributed among any number of client and/or server components. For example, various software modules may be implemented for performing various functions in connection with the present invention, and such modules can be variously implemented to run on server and/or client components.

Conceptual Architecture

Figure 4:
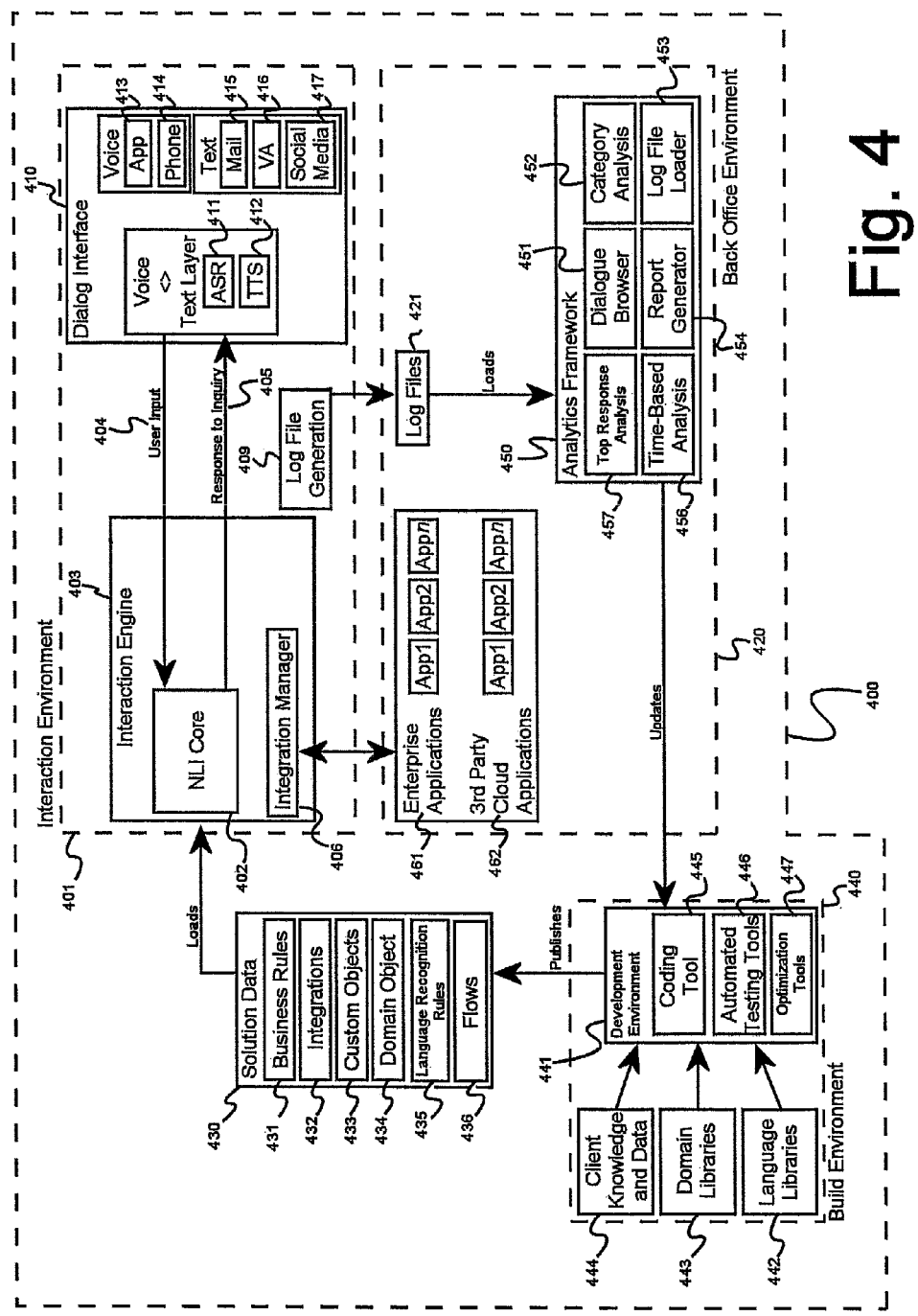
FIG. 4 is a detailed architecture diagram of a method for natural language processing.

FIG. 4 is a block diagram providing a conceptual overview of a method 400 by which human users may interact with a natural language interaction application such as a virtual assistant, according to an embodiment of the invention. According to the embodiment, user input or user request 410 is provided to a natural language interaction engine 403, which attempts to interpret the intention of the user request 410 and construct one or more appropriate responses to request 410 and provides any resulting responses 430 to user queries (or, analogously, responses or reactions to requests, for example when a virtual system does something as a result of being requested to do it, such as filling in a form or scheduling a meeting) using those constructed responses. Requests 410 to natural language interaction engine 403 may be made using any of a number of user interface means known in the art, including but not limited to use of text-based requests 412 (for instance, generated by typing a question or command into a text entry field in a user interface, such as on a mobile device application, on a consumer device, on a web site, or in an email or other message), spoken requests 411 (for example, if a user speaks a command or a question into a microphone on a mobile device or consumer device, the command or question then being converted into a more computer-usable form—typically but not necessarily a text string that comprises either a full transcription of the spoken command or request, or a standardized text element that is substantially semantically related to the spoken command or request), or even haptic or other user interface means 413 (for instance, taking actions such as pressing a button on a mobile device, or shaking or orienting a mobile device in a specific way, or similar actions). Similarly, in general responses 430 may be rendered as speech 431, text 432, graphics 433 (for example, a plurality of images to allow a user to review possible hotel choices), haptics 434 (for example, touch-sensitive or mechanical buttons, slide bars, selection interface elements that allow a user to select a region or a plurality of specific elements of a screen, and so forth), or emotions 435 (for example, an avatar adapted to dynamically display different emotions as appropriate for particular responses 430). Indeed, response 430 may take any appropriate form or combination of forms (for example, in a multimodal interaction, a response might also be multimodal, comprising for example speech output and approximately simultaneous display of an appropriate image on a device screen). Responses 430 may comprise a natural language response (including for example text-based output, spoken output), or changes in one or more graphical user interface elements (for example, in response to a request, "Please tell me where I can eat near here", a list of selected restaurants might be displayed on a screen of a consumer device or a map with nearby restaurants might be shown on a mobile device), or both, for example. Responses 430 may also be actions directed by natural language interaction application 403 in response to an explicit or implicit request 410 from a user.

In order to formulate one or more appropriate responses to request 410, natural language interaction engine 403 carries out a process that may be broadly described as taking place in three steps. First, natural language interaction engine 403 analyzes 421 request 410 to determine its meaning (usually, by determining the user's intent). Analysis 421 may require preprocessing, for example to convert a spoken request 411 into a textual form suitable for further analysis (although it should be noted that, in some embodiments, audio data obtained from a spoken request 411 could be analyzed directly using one or more speech analytics technologies known in the art). Analysis 421 typically involves parsing request 410 and then analyzing its semantic content to determine one or more possible user intentions that motivated request 410. In many cases this may be straightforward (for instance, a request might be "Please set my alarm for 8 am", and accordingly the user's intent would easily be understood once the sentence was parsed), but in other cases it might be anything but straightforward (for instance, a user might say "Get out of here!" which has several possible intentions, depending on context). Thus it could be that output from analysis 421 could involve a certain amount of uncertainty, for instance in cases where an output of analysis step 421 comprises a list of possible user intents, perhaps with weights indicating their likelihood of being the user's actual intention.

Once analysis 421 is completed, natural language interaction engine 403 may undertake a reasoning step 422 to further elaborate or to better determine user intent. Interaction engine 403 may use advanced linguistic interpretation and business rules to simulate "intelligent thinking", allowing interaction engine 403 to appear to reason like a human and to determine a most appropriate way to respond to a user request 410. During this reasoning process 422, interaction engine 403 may take into account many contextual factors such as date, time, location of user, entities and facts discussed in a current or recent dialog, active flows, local context, global context, information picked up in previous dialogs, data about a user, and the like. In addition, inferences may be drawn based on data about one or more users (for example, when users do "this" they normally also want to do "that"). For example, if a user inquires about "next year's insurance premium", interaction engine 403 may understand context of "next year", but may need to seek clarification about whether the user is asking about home or motor insurance. In general, the goal of reasoning 422 is to reduce ambiguity about what a user meant in request 410, and to apply rules or other logical processing to take into account the extended context in which request 410 was made, in order to facilitate the final step of reacting 423. Once user intent is understood and relevant context has been taken into account, natural language interaction engine 403 may select and execute appropriate actions needed to react 423 to request 410. Suitable reactions may be to give an appropriate verbal, textual, visual, or haptic response, to ask for more information to disambiguate user intent (when for example disambiguation could not be carried out during reasoning step 422), to open a webpage, to play a video, to open another application, to automatically fill in a form, to invoke or update or interact with a third party service, to perform some form of multimodal output, or to execute a transaction for example by updating a database or by integrating with one or more backend or e-commerce systems. These three steps analyze 421, reason 422, and react 423) may all happen seamlessly in milliseconds with interaction engine 403 able to handle thousands of interactions simultaneously, or they may occur over an extended period of time, depending on context and the state of the device being used or its connectivity.

DETAILED DESCRIPTION OF EMBODIMENTS

FIG. 4 is a block diagram illustrating an exemplary arrangement of components of a system 400 for efficiently delivering natural language interaction applications according to an embodiment of the invention, showing more detail regarding the high-level conceptual architecture. As indicated above, key elements of system 400 typically comprise a natural language interaction engine 401, one or more solution data repositories 430, a build environment 440, and a back office environment 420. Each of these may in turn be comprised of several components, in varying combinations, as will be described in detail herein.

Interaction environment 401 normally comprises a dialog interface 410 and an interaction processing core engine 403. Dialog interface 410 performs functions necessary for media-specific interactions with users. A principal role of dialog interface 410 is to receive input from a user in order that interaction engine core 403 can successfully determine a user's meaning (and the user's intent), and to provide feedback or responses back to the user. For example, when interactions are conducted using speech interfaces, interaction may be either via a phone 414 (for example when a virtual assistant is used in place of a conventional IVR application) or via a dedicated voice application 413 (for example when a user of a mobile application or a web site interacts with a virtual assistant using an application, and no phone is involved). In either case (or indeed in other cases, such as embodiments where other means of exchanging voice communications via audio signals—of which many are known in the art—are used, such as interaction with a building control virtual assistant using an intercom system), it is generally necessary to convert speech input into some form of text, and conversely to convert text output into some form of speech output (although, it should be noted, there are limited means known in the art for analyzing speech signals directly—known in the art as speech analytics technologies—and these could be used directly to infer user meaning and intent). Normally this is done by a voice-to-text conversion layer within dialog interface 410, comprising an automated speech recognition (ASR) engine 411 and a text-to-speech (TTS) engine 412. Many of each of these components are well known in the art, such as those available from Nuance™, Acapela™ Ispeech™, Google™ and other vendors; any suitable ASR and TTS engines may be used according to the invention. In some embodiments, ASR 411 and/or TTS 412 are deployed integrally to system 400 (as shown in FIG. 4), while in others they may be deployed as separate services delivered over a network such as the Internet or a telecommunications network; such external services architectures may employ ASR 411 or TTS 412 provided by one or more third party service providers. Input may also be received (and output sent) via text-based media channels such as 415, dedicated virtual assistant interfaces 416 (for instance, when a virtual assistant equipped with a graphical avatar is embedded in a web site and, when activated by a user, is interacted with directly), a social media interface 417 such as Facebook™, LinkedIn™ Twitter™, and the like, or any of a number of other text-based media channels known in the art but not shown in FIG. 4 (such as, for example, text-based interaction with a virtual assistant from within a document such as a word processing document, a spreadsheet document, or a presentation document; kiosks such as at airport check-in counters, and so forth).

Once input has been received, it is passed as input 404 to interaction engine core 403, where it is reacted to and one or more responses 405 may be generated. When responses 405 are generated and sent to dialog interface 401, they are converted (using TTS 412) to speech form or spoken output, if required, and delivered to a user via either or both of a voice application 413 or a phone 414, or if response 405 is already in textual form it is passed directly to a text-based output channel such as email 415, virtual assistant 416, social media 416, and the like. As a further example illustrating how natural language interpretation can be used to enrich multimodal user interactions, consider a combination mobile phone application that proceeds as follows. First, a user presses a button to initiate the application, which displays or plays a welcome prompt (or both) to the user. The user may say an utterance expressing her intent or goal (for example, "I would like to arrange travel to Berlin tomorrow morning.") The application may then display a selection of radio-button style choices on the screen of the mobile phone, for example comprising "Flights", "Hotel", "Car/Transport", and "Recommended". At substantially the same time, the application may speak a phrase such as, "Where would you like to start to make travel plans? Select a button or tell me what you want to do." The user and the application may, throughout the subsequent interaction, use a blend of spoken, text, and haptic interface conventions to exchange information and satisfy the user's original (and any subsequently arising) intention). Thus it can be seen that many examples of natural language interaction applications envisioned by the inventors may involve multimodal interactions comprising two or more interface modalities (such as speech, text, buttons, images, videos, vibrations, sounds, and so forth).

When input 404 is received by interaction engine core 403, it is generally first handled by an input interpretation module 407, which manages the process of handling inputs 405, making various calls to one or more services of natural language interpreter core (NLI core) 402 (which services and associated processes are described in more detail below), in order to determine one or more meanings of a user's input 404 and to infer therefrom the user's intent. That is, a goal of input interpretation module 407 is to "understand" what a user wants, in order that NLI core 402, in conjunction with input interpretation module 407, can formulate one or more appropriate responses to input 404. Once a response type, or the content of a response, is determined, output generation module 408 is tasked with creating an appropriate response 405, which can then be sent to dialog interface 410 for delivery (in an appropriate medium or via an appropriate channel) to the requesting user. In general, every time input interpretation module 407 receives and processes a user input 404, and every time output generation module 408 formulates a response 405 and sends it to dialog interface 410, log file generation module 409 generates one or more log files 421 in order to capture a history of interactions between users and natural language interaction applications. In addition, more or less detailed information pertaining to processes carried out by NLI core 402 is passed to log file generation module 409 as well, in order that not only what transpired is recorded (that is, the inputs 404 and outputs 405), but also how it was done and why (that is, a history of decisions made, rules and flows executed, variables set, and so forth in NLI core 402 is captured). NLI core 402 may, in order to process user inputs or to create responses, require access to one or more external data sources or external services; such access is provided by one or more connection APIs 406, which manage interactions between NLI core 402 (and possibly also input interpretation module 407 and output generation module 408) and external data sources and services. Such external entities may comprise a plurality of enterprise applications 461 such as customer relationship management (CRM) systems, transaction management systems, trouble ticket tracking systems, inventory management systems, and so forth (it will be appreciated by one having ordinary skill in the art that essentially any enterprise or third party applications may be interacted with using standards-based APIs or other integration technologies, and thus any such enterprise applications known in the art may be used by interaction engine 401 as needed to serve users). Such external entities may also comprise a plurality of third-party cloud-based applications 462, or any other third party services or applications accessible via public or private interfaces (whether standards-based or proprietary), subject only to findability and security constraints.

NLI core 402, when processing requests received (after preprocessing) from input interpretation module 407, uses one or more solution data repositories (or simply "solutions") 430 that it loads as required. Solutions 430 generally comprise various combinations of business rules 431, integrations 432 (that is, configuration data necessary to carry out communications via connect APIs 406 with enterprise applications 461, third party cloud applications 462, and the like), custom objects 433 (such as script objects used to encapsulate frequently used functionality), domain objects 434 (which are collections of ontologies or ontological data sets that represent knowledge about one or more subject domains such as travel, finance, heart health, furniture, and so forth), language recognition rules 435 built up from language objects (which may comprise a large number of formal models of various language elements for one or more languages; language objects will be discussed in detail below), and flows 436. These solution data 430 components in turn may be preloaded as standardized knowledge bases when a natural language interaction application is created, or they may be hand-crafted by one or more natural language interaction (NLI) developer within build environment 440 (or both; it is quite common to start with a prebuilt set of knowledge base 430 components, and then to add new components or extend the added components from within build environment 440) or part of it can be automatically generated according to the embodied invention.

Build environment 440 comprises several components, organized in a preferred embodiment into a single application 441 (sometimes referred to as a "studio"), from which an NLI developer may access client knowledge and data 444, domain libraries 443, and language libraries 442. Build environment 441 typically comprises a graphical coding tool 445 and one or more automated testing tools 446. Thus, in a typical scenario, a developer building a new natural language interaction application such as a virtual assistant would, within a coding tool 445 in build environment 441, load one or more prebuilt language libraries 442 and domain libraries 443, edit these based on available client knowledge and data 444, and then test the resulting knowledge base 430 using one or more automated (or manual) testing tools 446 in order to test the behavior of her new application prior to its use. Once satisfied with a new solution 430 (and with the associated application's behavior), the developer would publish knowledge base 430, which would then be available for NLI core 402 to load and use in handling user requests 404. A key benefit of the build environment 440 approach envisioned by the inventors is that it enables NLI developers who are not necessarily research scientists (such as computational linguists) to rapidly prototype, test, refine, and then tune natural language interaction applications for particular domains or business needs. This makes it possible to move natural language interaction application development from being an activity typical of linguistic experts with technical skills to one practiced commonly by user without technical or linguistic skills and users such as businesses (large and small) and other organizations desiring to use natural language interaction applications in production.

According to a preferred embodiment of the invention, the process just described is part of an overall closed-loop process. The loop is made "closed" by the availability of an analytics framework 450, which can be used to automatically or manually analyze natural language interaction application performance in order to eliminate poorly functioning dialog elements, improve customer satisfaction, and so forth. Analytics framework 450 generally takes as input a plurality of log files 421 generated by log file generation module 409, although in some embodiments analytics framework 450 may take input directly in real time from interaction engine 410, for example by receiving requests 404, responses 405, raw user inputs, and processed outputs to users as they occur directly from the corresponding components of interaction engine 410 (and of course diagnostic information about decision-making and operational processes occurring within interaction engine 410 could similarly be obtained as they occur). Thus the log file-driven architecture shown and discussed herein should be taken as exemplary and not limiting. In various embodiments, analytics framework may comprise one or more of a top response analysis module 457, a dialog browser 451, a category analysis module 452, a log file loader 453, a report generator 454, and a time-based analytics module 456. In any particular embodiment of the invention, some, most, or all of these components may be present within analytics framework 450; moreover, in some embodiments one or more of these components (or other analytical components known in the art such as business intelligence engines, datamarts, and the like), may be implemented as standalone components separate from analytics framework, including for example delivery as web-based or cloud-based services from a third party analytics platform provider. It should be apparent to one having ordinary skill in the art that any combination or architecture of these and other analytical components may be used according to the invention, and that the particular arrangement shown in FIG. 4 is intended to be exemplary and not limiting.

Top response analytics module 457 is a software module that computes a ranked list of responses 405 generated by interaction engine 410 to user requests 404; in many embodiments, a corresponding ranked list of requests 404 that led to a particular response 405 may be provided (often by provision of a "drill-down" capability, so that when viewing a ranked list of responses 405, a user may right-click or take some other action to see what requests 404 led to that response 405 most commonly). Responses 405 (and corresponding requests 404) may be ranked according to one of many numerical or qualitative parameters, such as most popular, most used, most often abandoned from, most often viewed, most often complained about, or any other similar ranking metric. Top response analytics module 457 may automatically generate and maintain ranked lists of responses 405, or may do so on request from an analyst or other authorized user (or both). In some embodiments, users may be allowed to specify one or more custom ranking criteria (as long as they are susceptible of measurement based on data received from interaction engine 410); such custom rankings may be conducted on an ad hoc basis, although useful rankings may be added to the last of available standard rankings, and could be added to any automated ranking processes as well, if desired.

Dialog browser 451 is a user interface element that allows an analyst or other authorized user to view (or hear) one or more interactions or dialogs between users and natural language interaction applications. Users may be allowed to request random interaction sessions, in which case one or more sessions would be displayed for viewing at a time; such a view would be useful for example to a marketing analyst who wants to "see" how users interact by randomly browsing among user experiences. Users may also select one or more sessions for viewing (or listening), based typically on any of a wide range of filters or selection criteria made available through a user interface of dialog browser 451. For example, a user could request to view all interactions with a specific user, or with a specific user/application pair, or relating to a particular subject such as a particular product or small talk, and so forth. Users may also request a specific interaction by providing a time, or a session identifier, or a customer name and a time, or any other filtering arrangement that can distinguish the desired session from all others.

Category analysis module 452 is typically a graphical user interface component that allows an analyst or other authorized user to view one or more, or all, sessions or interactions that pertain to a particular category (such as a category within a domain model, for instance by requesting to view a sampling of sessions involving furniture-related questions). Users of category analysis module 452 may be able, for example, to view all or a set of sessions (or to view aggregated numerical data pertaining to such sessions) that were about home equity loans. While viewing such a set of data or sessions, the user might be able to explore for example whether certain questions related to home equity loans are more commonly received from customers that are actually considering taking out such a loan; this might be determined, for example, by displaying columns of data about "probability of loan application being taken" and "probability of closing of loan applications taken", and allowing a user to rank sessions by one or another column in order to understand such patterns. It should be clear to one having ordinary skill in the art of data analytics that there are many ways of viewing and analyzing data of this type, any of which may be included in category analysis module 452 according to the invention.

Time-based analysis module 456 is typically a graphical user interface element that allows an analyst or other authorized user to configure, conduct, schedule, and view the results of various analyses of one or more time-based behaviors of natural language interaction applications and/or their users. For example, time-based analysis module 456 may in some embodiments be used to identify trends in user behavior, such as the emergence of new dominant questions or shifts in linguistic usage over time. Another example, likely to occur quite readily, would be the use of time-based analysis module 456 to study assimilation of new application capabilities upon their introduction in one or more natural language interaction applications. When new capabilities (for instance, new language models, improved business rules, richer interaction modality options, or expansion of domain coverage) are added to an application such as a virtual assistant, their use by those who interact with the modified natural language interaction application is likely to vary over time as more and more users become accustomed to the new capabilities; such user assimilation can be studied to learn how long to wait before expecting changes in user behavior (such knowledge would be quite useful in avoiding for example the premature termination of an experimental feature, which might occur if knowledge engineers misunderstood a normal "uptake curve" for lack of user interest). Similarly, in some embodiments time-based analysis of users' natural language inquiries may uncover emerging linguistic elements, such as the emergence of new "buzzwords", common off-topic questions such as "What do you think of the Avengers movie?", or topics of interest (any of which might suggest modifications to knowledge base to maintain a high degree of user acceptance and virtual assistant fluency).

Report generator 454 is typically a graphical user interface element that allows an analyst or other authorized user to design, configure, schedule, edit, manage distribution of, or view one or more periodic or ad hoc reports regarding operation of interaction engine 410 or virtual assistants hosted by it. Similarly to output from time-based analysis module 456, reports generally prove very useful in detecting trends or emerging problems with natural language interaction applications, language or domain models, or the infrastructure or applications of interaction engine 410. For example, a report might provide tabular and graphical data pertaining to the number of occurrences of various types of interactions using one or more applications, and data for each row or category of interaction for each time period might include items such as the number and/or percentage of sessions that terminated either prematurely or in an unexpected way, the number of sessions that resulted in or involved a product sales inquiry, the number of those that resulted in a sale, and so forth. It is common in the art for reports to be useful in understanding such issues as diurnal patterns of user behavior (for example, users might be more likely to conclude purchases during early evening hours, and might engage in a higher level of off-topic "small talk" in the hours after midnight). It should be clear to one having ordinary skill in the art that any of the many infrastructure, data presentation, drill-down and drill-up, filtering, and other options known in the well-developed art of enterprise application reporting may be used according to the invention. Of course, the range of inferences that might be made through use of analytics based on natural language interaction engine 403 data is quite broad. For example, in some implementations it may be desirable to identify particular channels (media types, such as email, phone, kiosk, instant messaging, and so forth), particular operating systems, particular browsers, and similar specifics regarding a plurality of users. As an exemplary use of such data, it may be that users of Macintosh™ computers from Apple™ might be found to demonstrate certain typical habits and preferences, knowledge of which might allow for effective tailoring of natural language interaction engine 403 to better serve those customers.

Log file loader 453 is typically a graphical user interface element that allows an analyst or other authorized user to manage the configuration and scheduling of log file loading (or to configure real time data acquisition, when that approach is taken to gathering data from interaction engine 410), and to carry out ad hoc log file activities such as log file pruning, exporting of log files to other systems, archiving or configuring archival of log files onto long term storage systems, and so forth.

In most embodiments, the various components of analytics framework 450 are tightly coupled, for instance by allowing an analyst or other user to move directly from one tool or view to another with a simple user interface action such as selecting a button, choosing a tab, or picking a different view from a context-sensitive menu. For example, a user viewing a list of sessions in a category analysis screen 452 might select one or more sessions from a list (for example, by shift-clicking them using a mouse, or using a check button interface element) and then select "browse dialogs" to view the selected sessions in dialog browser 451. It should be appreciated by one having ordinary skill in the art that many styles of linking of related user interface elements and analytic functionality exist in the art, any of which may be used according to the invention.

Figure 5:
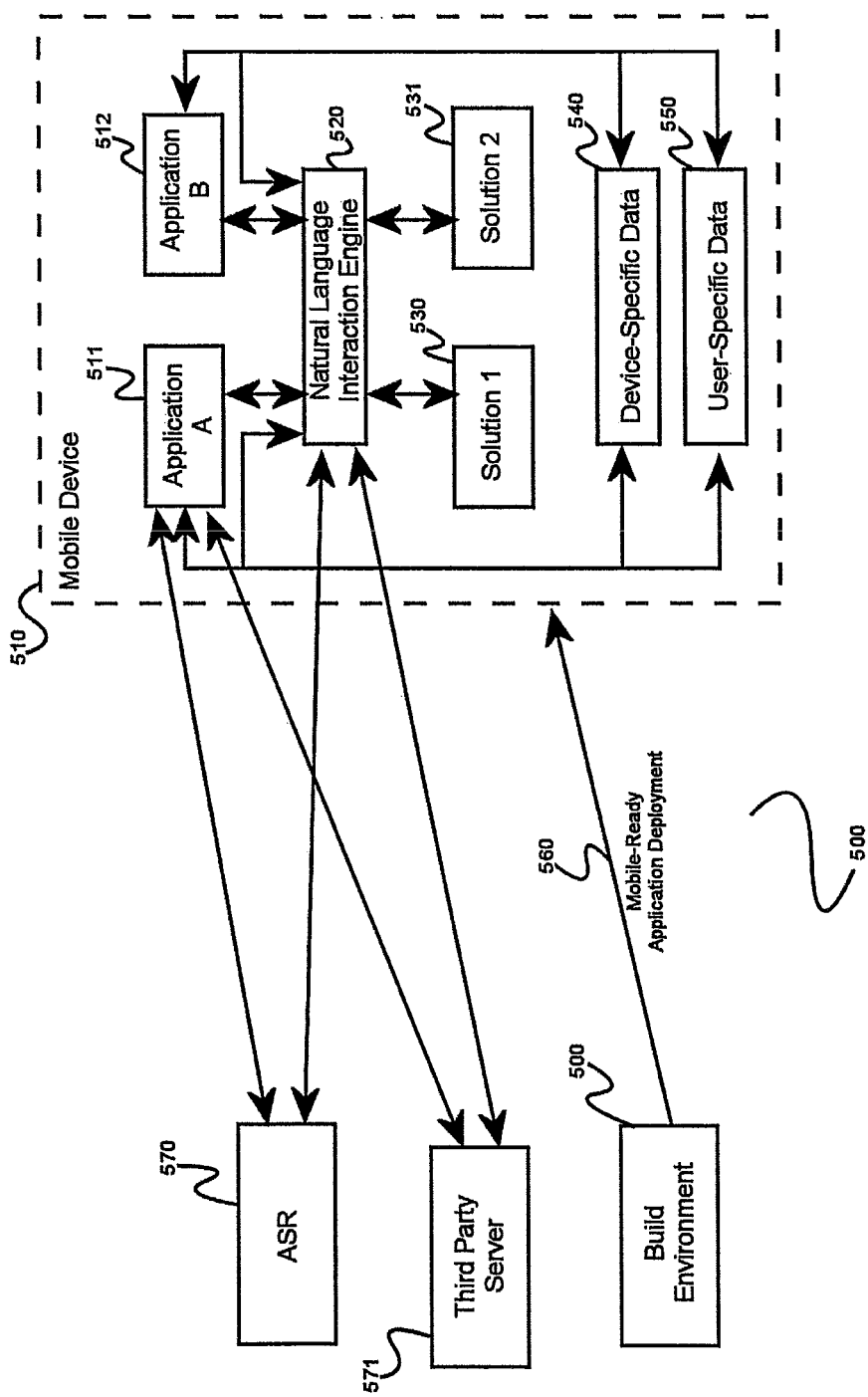
FIG. 5 is a block diagram of a system with a natural language interaction engine residing on a mobile device.

FIG. 5 is a block diagram of a system 500 with a natural language interaction engine residing on a mobile device, according to an embodiment of the invention. According to the embodiment, a portion of the functionality of natural language interaction engine 403 and its associated components may be deployed on a mobile device 510. In particular, natural language interaction engine 520 may be deployed in full or in part on mobile device 510, which is advantageous at least because, to the extent a fully functional natural language interaction engine 520 is deployed on a mobile device 510, one or more natural language applications 511, 512 may be executable on mobile device 510 even when the device lacks network connectivity. Since most mobile devices 510 are at least intermittently disconnected from networks, the ability to operate robust natural language applications such as application A 511 and application B 512 clearly represents a significant usability enhancement over those natural language applications known in the art. For example, Apple's Siri™ virtual assistant product only works when connected via a mobile telephony network to one or more servers operated by Apple, which represents a usability problem for situations where users lose network connectivity (for example, in many places users traveling in cars, trains, or planes may go for significant periods with no network connectivity, and may also experience only degraded or intermittent network connectivity when on a network). Since it is well known in the art that some types of services such as ASR 570 may be too processor-intensive to be deployed entirely onboard mobile device 510, natural language interaction engine 520 may interact or utilize ASR 570 or other third party services 571 (such as, for example, text-to-speech, search engines, and the like) when connected to a network to augment functionality available to either application A 511 or application B 512 or both (of course, applications 571 and 572 are merely exemplary, and more or fewer applications may be deployed continuously or intermittently on mobile device 510, according to the invention; for example, some applications may be uploaded temporarily to run on mobile device 510 and then deleted once used until they are needed again). Of course, ASR 570 may be deployed on a mobile device 510 if such a device has sufficient processing power to handle a particular set of speech recognition tasks; it is anticipated that such deployments may become more and more common as the processing power available in mobile devices continues to improve. In other embodiments, some portion of ASR 570 may be deployed on device 510 while others remain on one or more network-connected servers. For example, simple ASR 570 grammars might be used on-device, and unrecognized or poorly-recognized speech might be sent as needed to a server for further ASR 570 processing.

According to the embodiment, build environment 400 may be used to develop and deploy natural language applications such as application A 511 and application B 512. In some embodiments, natural language interaction engine 520 is a mobile application that is deployed from an application store or downloaded directly from a web site or other source by a user, and that interacts with one or more separate mobile applications 511, 512 using data from one or more solutions 531, 532. In other embodiments, solutions 531 and 532 might be loaded directly into applications 511 and 512, respectively. In yet other embodiments, a solution 531 and a natural language interaction engine 520 may be embedded fully into a standalone mobile application 511; while in other embodiments individual solutions 531, 532 may be deployed either as separate mobile applications 511, 512 that interact with engine 520 or as modules that are downloaded to device 520 and installed as add-ons to engine 520. Build environment 400 will typically comprise exemplary features described above with reference to FIG. 4. When a developer has completed and tested a natural language application such as a virtual assistant, then mobile-ready application deployment 560 may be carried out across one or more data networks or mobile telephony networks, to deliver the resulting application to a plurality of mobile devices 510, either on demand, as implicitly needed, or via for example the mediation of an "app store" such as are well known in the art (in which case, typically a user of mobile device 510 would explicitly select a mobile-ready natural language application 511, 512 and upload it to her mobile device 510. According to the embodiment, natural language applications need not be tightly bound in a one-to-one relationship with solutions such as solution 1 530 and solution 2 531. For example, solution 1 530 might be a travel-related solution, comprising elements such as those described above with reference to item 730 in FIG. 7, and solution 2 531 might be a credit card transaction solution. Both solution 1 530 and solution 2 531 may be deployed (either permanently or temporarily under user of system control) on a single mobile device 510 (and indeed a plurality of other solutions may be as well, limited only by available resources on mobile device 510). Continuing the example, application A 511 might be an airline reservation application (perhaps provided by an airline itself, or by a third party application vendor), which might make use of language recognition rules and flows (among other items) from both solution 1 530 (for travel-related flows) and solution 2 531 (for credit card transaction related flows). Similarly, application B 512 might be a virtual assistant application using natural language user interaction, facilitated by natural language interaction engine 520. Such a virtual assistant application might only occasionally have need to use solution 1 530 (for example, when the user of mobile device 510 desires to set up a flight itinerary using virtual assistant application 512); similarly, virtual assistant 512 might also have occasional need for solution 2 531 to conduct credit card transactions (whether or not related to travel). Thus it should be clear to one having ordinary skill in the art that a plurality of solutions 530-531 may be deployed on mobile device 510, and that these solutions may make their capabilities available to all or a portion of a plurality of natural language applications 511-512 deployed on mobile device 510. Moreover, natural language applications 511-512 may typically be provided with access (generally subject to application-based or user role-based security restrictions imposed by mobile device 510) to device-specific data 540 (such as location data, device 510 orientation and other environmental data, map data stored on or accessible via mobile device 510, and so forth) or user-specific data 550 (such as a user's address, phone number, location history, preferences, or even sign-on data to various online services such as Twitter™, Facebook™, and the like). Thus FIG. 5 shows a valuable embodiment of the invention in which a user of a mobile device 510, even when only intermittently connected to the Internet or a mobile telephony network, may enjoy rich, natural language-based applications with low latency resulting from their residence on the mobile device 510 itself (while still being able to invoke or utilize any number of network-resident services such as ASR 570 and other third-party services or servers 571).

Figure 6:
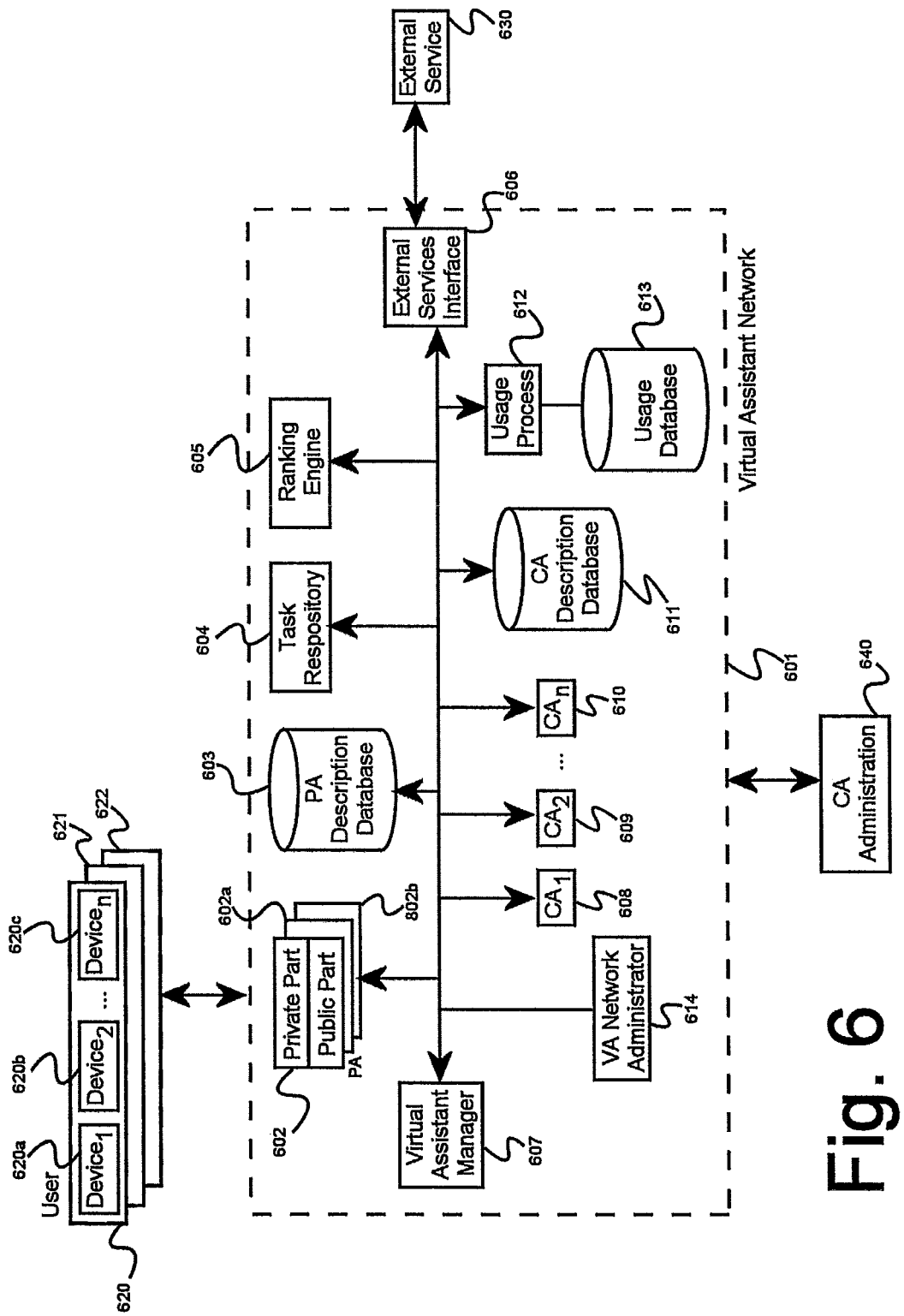
FIG. 6 is a block diagram of a social network of virtual assistants by which virtual assistants interact with each other and with users.

FIG. 6 is a block diagram of a network of virtual assistants by which virtual assistants interact with each other and with users, according to an embodiment of the invention. Virtual assistant network 601 consists of one or more personal virtual assistants 602 (Herein, referred to as PAs) and one or more common virtual assistants 608, 609, and 610 (Herein, referred to as CAs). A PA is an automated virtual assistant by which human users 620 may interact, for example, through natural language interaction between user 620 and PA 602, to interpret the intention of a user request 410 and construct one or more appropriate responses to request 410 and provides any resulting responses 430 to user 620 queries (or, analogously, responses or reactions to requests, for example when a virtual system does something as a result of being requested to do it, such as checking the status and availability of common services like checking for movie tickets and show times) using those constructed responses. A PA may interface to one or more external services 630, for example web services from a corporation or service provider over the internet, to one or more other PAs 602, and/or one or more CAs 608, 609, 610 to fulfill requests by user 620. A CA is an automated virtual assistant that can reside online, on a device, and/or in embedded systems, typically in a corporate or a service provider environment, but may not always be the case, that has an ability to provide responses to requests by other virtual assistants 602 or directly from users 620, for example, customer service and other informational requests. In some embodiments, CAs 608,608, 610 may be a complement to customer service by humans or replace human-based service altogether. Both PAs 602, 602*a*, 602*b* and CA 608, 609, 610 may be implemented via one or more services (for example, through Twitter™, Instant Messaging services such and Microsoft Lync™, Social Media platforms such as Facebook™ web services, etc.) and/or embedded within a device or system (for example, Mobile telephones, tablet devices, laptop computers, a vehicle's control system, an appliance such as an elevator, etc.) known in the art. Once PA 602 registers with virtual assistant network 601, a record is created, or updated, in PA description database 603 describing user preferences (for example a user's hobbies, areas of interest such as genres of literature and movies that she likes, other likes and dislikes, other demographical information, personal information, user specific data, payment information, device dependent/independent settings, etc.) as well as privacy settings detailing which information to expose to other PAs 602, CAs 608, or external services 630. PA 602 consists of a public part and a private part. The public part exposes information and functionality that can be accessed by other PAs 602, CAs 608, or one or more external services 630. The private part of PA 602 exposes information which is accessible only to user 620 (that is, the owner of PA 602). PA 602 can reside physically on one or more devices 620*a*, 620*b*, 620*c* (for example a mobile phone, a personal computer, etc.), within an embedded device 620*b* (for example, a home automations system), in the cloud, etc. as separate instances or as access points to the same instance. Each PA 602 instance holds the information needed to function and any limitations in capabilities (for example, an on-device PA 602*b* may be limited in functionality when no internet access is available; a device, for example in an embedded system, may only have an audio interface (i.e. no video), etc.). Each PA 602 instance may periodically synchronize preferences (for example a new privacy setting, a new connection to a friend's PA 602*b*, etc.), updated information (for example, a change in physical location, calendar setting, etc.), and/or other user-specific data with PA description database 603. PA description database 603 may also hold information about other PAs 602*a* authorized to use the public part of a PA 602 and task descriptions of services available for authorized PAs 602*b*. Different PAs 602*a* in virtual assistant network 601 may have access to different parts of the public part of a PA 602 based on the configuration and privacy settings. One or more CA 608, 609, 610 can be connected to the virtual assistant network 601. Once connected, a description of CA 608 capabilities is stored in CA description database 611 (for example, CA 609 may have domain-specific capabilities, such as those used in conducting financial transaction such as finding the best mortgage rates, or performing stock purchases and sales) and one or more PAs 602, and other virtual assistants, may discover capabilities and services available from CA 608 to make use of them.

Virtual assistant mediator VAM 607 facilitates communication between one or more PAs 602, one or more CAs 608, and/or one or more external services 630. To facilitate communications, VAM 607 uses PA descriptions stored in PA description database 603 to understand the preferences (for example, a preferred external service such as Expedia.com™ for travel arrangements), relationships to other PAs 602*b* (for example, virtual assistants of friends and colleagues), preferred CAs 610 (for example, a virtual assistant that relays stock quotes that uses a particular celebrity's voice pattern), and the like. Furthermore, VAM 607 uses CA descriptions stored in CA description database 611 to be informed of what services may be available. Virtual assistant network 601 provides task repository 604 that contains application logic and natural language understanding rules that can be downloaded and/or integrated into one or more PAs 602, one or more CAs 608, 609, 610, or to external services 630 as needed. VAM 607 auto generates natural language recognition rules for each task and adds it to task repository 604 (for example, product names that are not standard language words may require specific natural language recognition rules). Usage process 612 records details on the usage and interaction of virtual assistant network 601 (for example, which PAs connected to which CAs, survey information about a CA or an external service, trust parameters, satisfaction parameters, connectivity issues, and other information), and saved for analytic purposes to usage database 613. Communication between one or more PAs 602, CAs 608, 609, 610, external services interface 606, and/or other system components, is routed via VAM 607. In some embodiments, VA network administrator 614 may manually process a request forwarded by VAM 607. For example, VA network administrator 614 adapts PA 602 natural language recognition rules to user 620's profile (for example, adapting to a specific dialect or difference in standard vocabulary), or enables and customizes one or more external services 630 (for example, access to a subscription-only investment brokerage website). In another embodiment, VA network administrator 614 may enable a human process to provide input to aid in a request by PA 602 where an automated process may not be able. For example, if a web service requires "captcha" input (that is, a type of challenge-response test used in computing as an attempt to ensure that the response is generated by a human).

To prevent session hijacking, that is, to gain unauthorized access to information, services, or components in virtual assistant network 601, PA 602 may disconnect from CA 608 or another PA 602 at any time (for example, by giving a certain command, or based on some alarm or threshold).

In order to facilitate service CA 610 may connect to an external service 630 via one or more external services interface 606. For example, a request from user 620 for PA 602 to order a pizza may access an online mapping service, such as Google Maps™, to determine which pizza vendor may be closest in proximity. In this example, the vendor has a web services interface that may be used by PA 602 to fulfill the request. In another embodiment, a vendor may already have CA 610 that can be used to interface with PA 602 to fulfill the request or a dialog hand-over happens and user 620 directly with CA 610.

Figure 7:
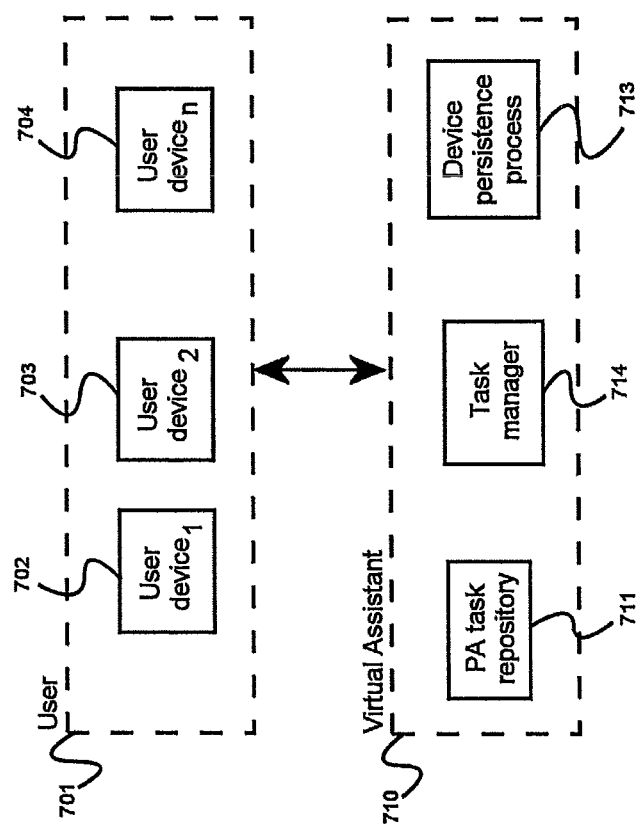
FIG. 7 is a block diagram of a persistent virtual assistant across multiple platforms in a social network of virtual assistants.

FIG. 7 is a block diagram of a persistent virtual assistant across multiple platforms in a social network of virtual assistants, according to an embodiment of the invention. In a preferred embodiment, virtual assistant 710 may be independent of device (for example, mobile telephone, laptop computer, television, automobile navigation system, etc.) to provide cross platform support and thereby allowing user 701 to continue a session held on user device 701 on another user device 703. The ubiquitous nature of virtual assistant 710 is performed by maintaining a persistence of knowledge by preserving dialog sessions and techniques for dialog resumption as well as adaptation to various devices in device persistence 713. For example, user 701 begins a dialog with virtual assistant 710 on user device 702 (for example, a laptop computer). User 701 desires to transfer the interaction to user device 703 (for example a smart phone) by issuing a command (for example, a verbal statement) to virtual assistant 710. Virtual assistant 710 sends dialog session information to device persistence process 713. User 701 interacts with virtual assistant 710 on user device 703. Virtual assistant 710 checks device persistence process 713 and sees that a session in progress and asks user 701 if she wishes to continue where it left off.

In another embodiment, virtual assistant 710 may handle intermittent connectivity and be able to continue processing requests from user 701 that require connection when connectivity resumes. For example, user 701 may request virtual assistant 710 to block off time in her calendar. In this example this request happens when virtual assistant is unable to connect to user 701's calendar. As such, virtual assistant 710 may add the calendar task to task repository 711. When connectivity resumes, virtual assistant 710 sees the task in the task repository and completes the request.

An exemplary dialog between user 701 and virtual assistant 710 is as follows:

User 701 is in a car interacting with virtual assistant 710 on user device 704 (for example, embedded into the car audio system). User 701 utters, "Can you check flights to Paris for Friday?"

Virtual assistant 710 may assume that the flight is to commence in London where user 710 resides. Furthermore, based on data in virtual assistant description database 603, virtual assistant 710 may know that user 701 does not prefer to fly low cost. Virtual assistant 710 utters, "I have found ten flights for Friday. When do you need to be there?"

User 701 interrupts the dialog by uttering, "We will have to continue later I am home now." Virtual assistant may place a time stamp on the dialog and store it in task repository 711.

At some later point in time, user 701 starts user device 702 (for example, a laptop computer). Virtual assistant 710 utters, "Hi, what about that flight? Should we continue?"/In this example, user 701 agrees.

Virtual assistant 710 adapts to device 702 that has a larger screen and utters, "So, I had found ten flights for Friday. Do you want me to show you the list?"

And so on.

In some embodiments, virtual assistant 710 may, for example, be configured with rules as to when to resume a dialog. For example, in the above example, virtual assistant 710 may not have resumed the dialog after the uttered departure date had passed for the intended flight.

In another embodiment, virtual assistant 710 may, for example, simply state that there is an unfinished dialog.

In another embodiment, virtual assistant 710 may, for example, not resume a task based on the capability of user device 704 that may not be capable of enabling the successful outcome of the request.

In another embodiment, virtual assistant may, for example, prioritize unfinished dialogs and present them to user 701 in order of priority or some other desired order.

In another embodiment, virtual assistant 710 may, for example, collect actions that require connections and not revisit those dialogs with user 701 until connectivity is available.

In another embodiment, user 710 may, for example, explicitly tell virtual assistant 710, in natural language, to postpone the task (for example, "let's talk about that later").

In another embodiment, user 710 may, for example, stop the dialogue with virtual assistant 710 (for example, by uttering a command or interaction via an interface on user device 702).

In another embodiment, dialogue between user 701 and virtual assistant 710 may be interrupted by some external factor (for example, an incoming call on mobile device 703)

In another embodiment, dialogue between user 701 and virtual assistant 710 may be interrupted by user 701 being, for example, distracted and not responding to virtual assistant 710.

In another embodiment, dialogue between user 701 and virtual assistant 710 may be interrupted by the connection between the user 710 and virtual assistant network 601 shuts down.

In a preferred embodiment, tasks and/or dialogs can be resumed by user 701 or virtual assistant network 601, for example, when:

user 701 has finished a secondary task that it switched to, and a postponed task is still active when the connectivity between virtual assistant 710 and virtual assistant network 601 has been restored if user 701 explicitly requests virtual assistant 710 to resume a task (for example, "let's go back to that booking")

if user 701 selects a GUI menu, for example, on user device 703 by clicking to resume a task when an interruptive factor stops (for example, an incoming call has finished on user device 702), virtual assistant 710 can resume dialogue with user 701 when a new session starts on the same user device 702 or another user device 703

In some embodiments, tasks might be device dependent and may not be resumed on another device. For example, a task started on user device 702 (i.e. a laptop computer) may not be resumed on user device 704 (i.e. automobile navigation system)

A postponed task can be cancelled for several reasons:

Task has passed a pre-configured hibernation period (for example, virtual assistant 710 may be configured such that a task can only be active for a certain amount of time)

Explicitly by user 710 when resumed by a command (for example, user 701 utters, "forget about that")

User 701 can graphically delete the task via a GUI on user device 703.

Task manager 714 handles user 701's active and postponed tasks to:

keep tasks in a data structure (for example, a stack, tree, queue or heap). It will be appreciated by one having ordinary skill in the art that a data structure is a particular way of storing and organizing data in a computer so that it can be used efficiently set status of tasks (for example, hibernation period, status, time when task was latest active, etc.)

store tasks with task parameters keep information in virtual assistant network 601 so that it is accessible from different user devices 702, 703, 704 to allow for device independent resumption make use of methods for postponement of tasks, resumption of tasks, cancellation of tasks, etc.

hold resumption strategies and interface to device persistence process described earlier that may adapt to the task conditions, for example, a different strategy may be invoked if a task is resumed after a short interruption as opposed to resuming a task after a day or on a different device or modality. For example, with an interruption of a shorter time period, virtual assistant 710 may utter a specific portion of the dialog, for example, "So, what date did you want to fly?" (It will be appreciated by one having ordinary skill in the art that a shorter time period for an interruption would result in a reduced chance of user 701 forgetting where the dialog left off), whereas for an interruption of a longer time period, virtual assistant 710 may utter a more general statement to refresh the mental state of user 701 for the task, for example, "Should we continue with the flight booking to New York?" (It will be appreciated by one having ordinary skill in the art that a longer time period for an interruption would result in a increased chance of user 701 forgetting where the dialog left off if not forgetting the entire dialog altogether)

Task parameters may be obtained in several ways, for example:
  From another dialog flow
  From another user 701 in a dialogue
  From personal information of user 701

Figure 13:
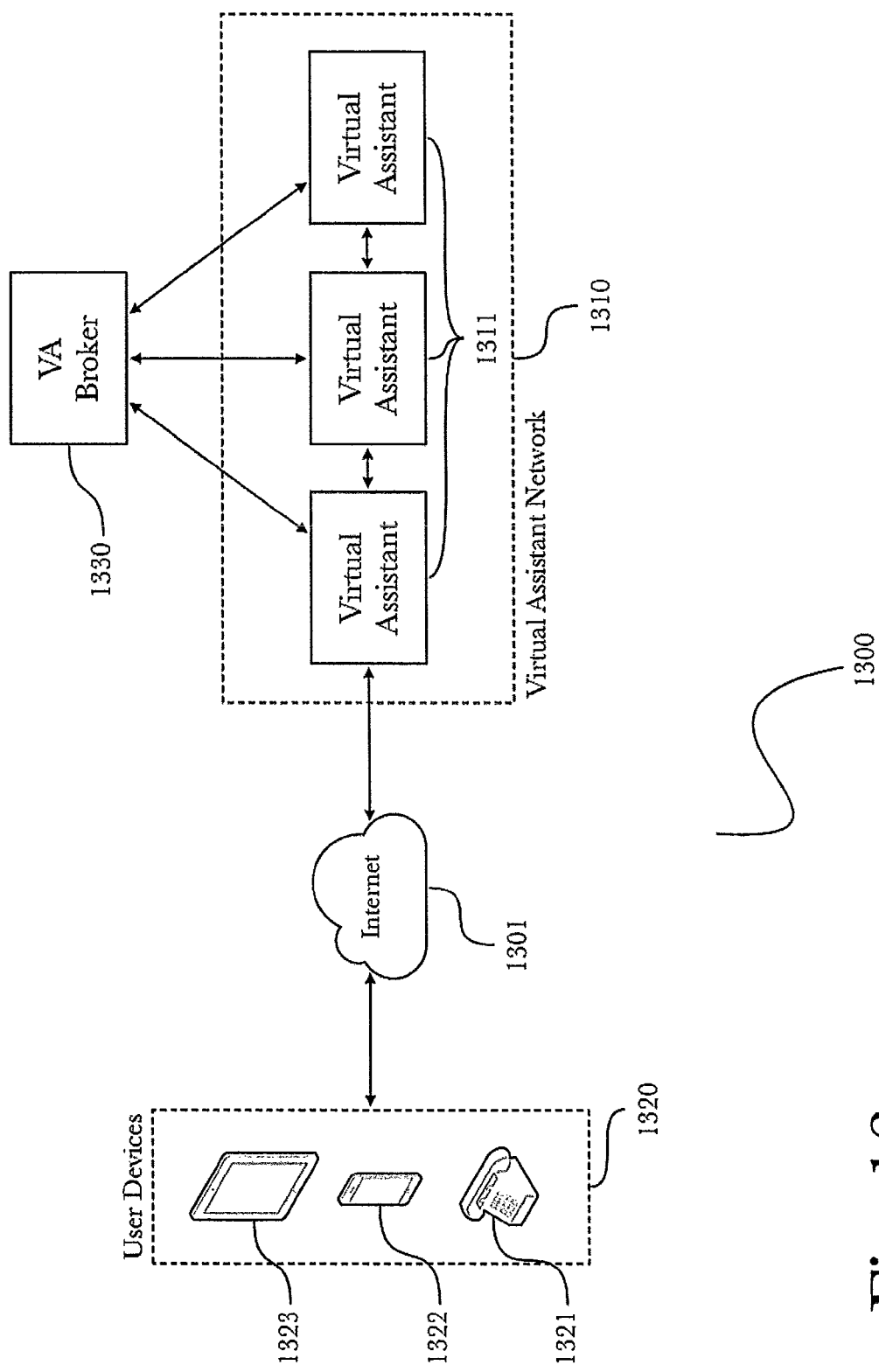
FIG. 13 is a block diagram illustrating an exemplary arrangement of a virtual assistant network, showing the use of multiple virtual assistants with a broker, according to a preferred embodiment of the invention.

Task parameters and data may have conditions or constraints, for example:
  Local or global in scope (for example, may only be used only in current task or can be used in other tasks)
  Life time of a task parameter
  Device dependent task parameters FIG. 13 is a block diagram illustrating an exemplary arrangement 1300 of a virtual assistant network 1310, showing the use of multiple virtual assistants with a broker, according to a preferred embodiment of the invention. As illustrated, a plurality of virtual assistants 1311 may be connected to the Internet 1301 or another appropriate communications network, such as to receive requests from user devices 1320. A user device may be any suitable network-connected device, such as a telephone 1321, smartphone 1322, tablet computing device 1323, or any other such device according to the invention. As illustrated, virtual assistants 1311 may be in communication with each other, such as to interact as needed during the fulfillment of a user's request, for example if one virtual assistant (VA) is more suitable for handling the request than another. In such an instance, the request may be sent from the original "host" VA to the more capable "target" VA for fulfillment, and the result then sent back to the host for presentation to the user. In this manner, a virtual assistant network (VAN) 1310 may facilitate more effective fulfillment of user requests without impacting user experience, as the user may perceive that they are only interacting with a single VA as per normal operation.

As further illustrated, a VA broker 1330 may be utilized, such as to facilitate management of a VAN 1310 or to assist in optimal routing of networked operations. For example, a VA broker 1330 may maintain a repository of information related to specific VAs within a network, such as their respective capabilities or knowledge bases, and may use this information to optimally handle requests as needed. As an example, if a host VA is given a request it is unable to fulfill (or, optionally, that it may be capable of fulfilling but to an unacceptable degree, as might be configured to optimize customer satisfaction with assistant interactions), a request complying with the inter-VA communication protocol might be sent to a broker 1330 for assistance. The request may contain a natural language expression and additional structured data. Based on the data in the request and known information about the VAN 1310, the broker 1330 may then find and return information about one or many suitable VA's for fulfillment. The host VA may decide whether to forward the request to any of the suggested target VAs. If so, the host VA communicates with the target VA using the standardized inter-VA protocol. Alternatively, the VA broker may return a list of target VAs to the host VA, the list comprising target VAs that it determines may be likely to be useful in satisfying the request sent by the host VA. The communication between the user and the target VA is done via the host VA. In this preferred embodiment, the host VA exercises full control over selection of a target VA to fulfill the request. In other embodiments, the host VA may evaluate the suitability of a plurality of target VAs and then select a specific target VA and send the relevant information regarding the selected target VA to the host VA. In yet another embodiment, the VA broker may receive responses from a plurality of target VAs to whom it sent a request received from the host VA, and then select from among the received responses that response which is believed to be most suitable for the received request, and send the selected response to the host VA. Again, it will be seen that the host VA controls the actual user interaction. When a host VA receives a list of eligible target VAs from a broker, the host VA decides when to initiate the dialog with a selected target VA (in this case, selected by the host VA, possibly as a result of user interaction), when to forward a user's input, and how to handle a response from a target (example: display natural language response received from the target, respond to a request from the target). The host VA decides when to drop the dialog with a target, based for example on signals from the user, signals from the target or other reasons decided upon by the host VA. In this manner, it can be appreciated that networked virtual assistant operations may be further optimized through the use of a broker to increase efficiency and relevancy, but that a broker need not be required for a VAN to operate (as the VAs may be able to communicate between themselves, as described previously).

Figure 14:
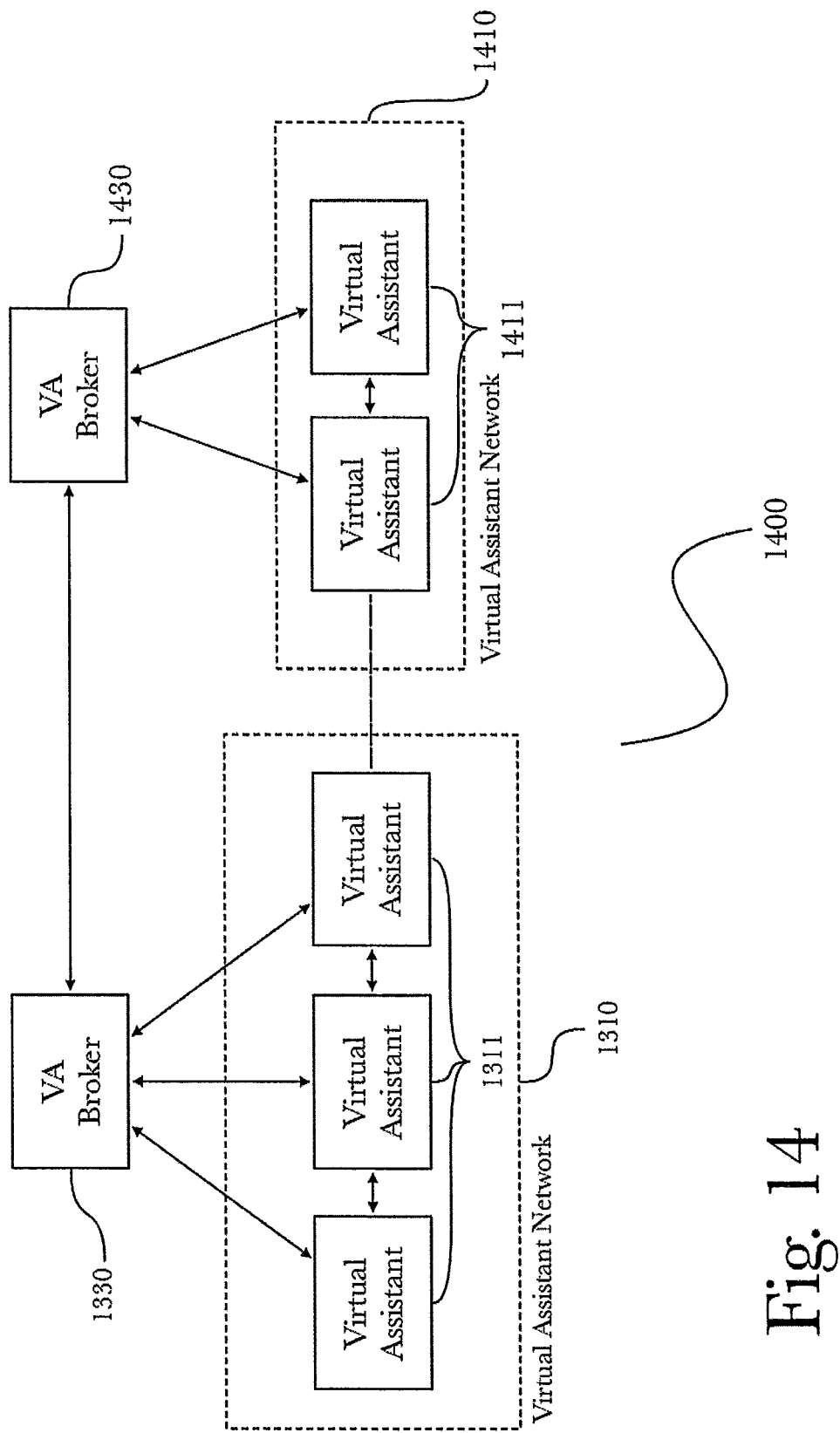
FIG. 14 is a block diagram illustrating communication between two virtual assistant brokers, each operating a distinct virtual assistant network.

FIG. 14 is a block diagram illustrating communication between two virtual assistant brokers, each operating a distinct virtual assistant network 1310, 1410. As illustrated, multiple virtual assistant networks 1310, 1410 may be served by separate VA brokers 1330, 1430, such as to facilitate discrete operation of each network but still allowing for inter-network operation when needed. As illustrated, individual VAs within a network may not be able to find target VAs outside of their respective network, but by interacting with a broker such networking may be made possible. A host VA broker 1330 may interact with a target broker 1430 as needed for request fulfillment, such as to find target VAs that the target broker 1430 has knowledge of. For example, a host VA broker 1330 may wish to utilize the capabilities of a regional VA 1411 for assistance with a particular request, so it may send the request (or the relevant portions of the request) to target VA broker 1430, which may then pass the request on to VA 1411 for handling, returning the results to host VA broker 1330 upon completion. In this manner, it can be seen that it is possible for individual VAs to find and interact with one another within a (possibly quite extended or extensive) VAN, as well as with a VA broker. It is also possible for a VA broker to interact with various VAs within a network, as well as with other VA brokers as needed, facilitating operation across individual virtual assistant networks as appropriate. In some embodiments, a VA 1311 in one virtual assistant network 1310 may communicate directly with a VA 1411 in another virtual assistant network 1410, generally after having at least once been referred to each other by a VA broker 1330, 1430.

Figure 8:
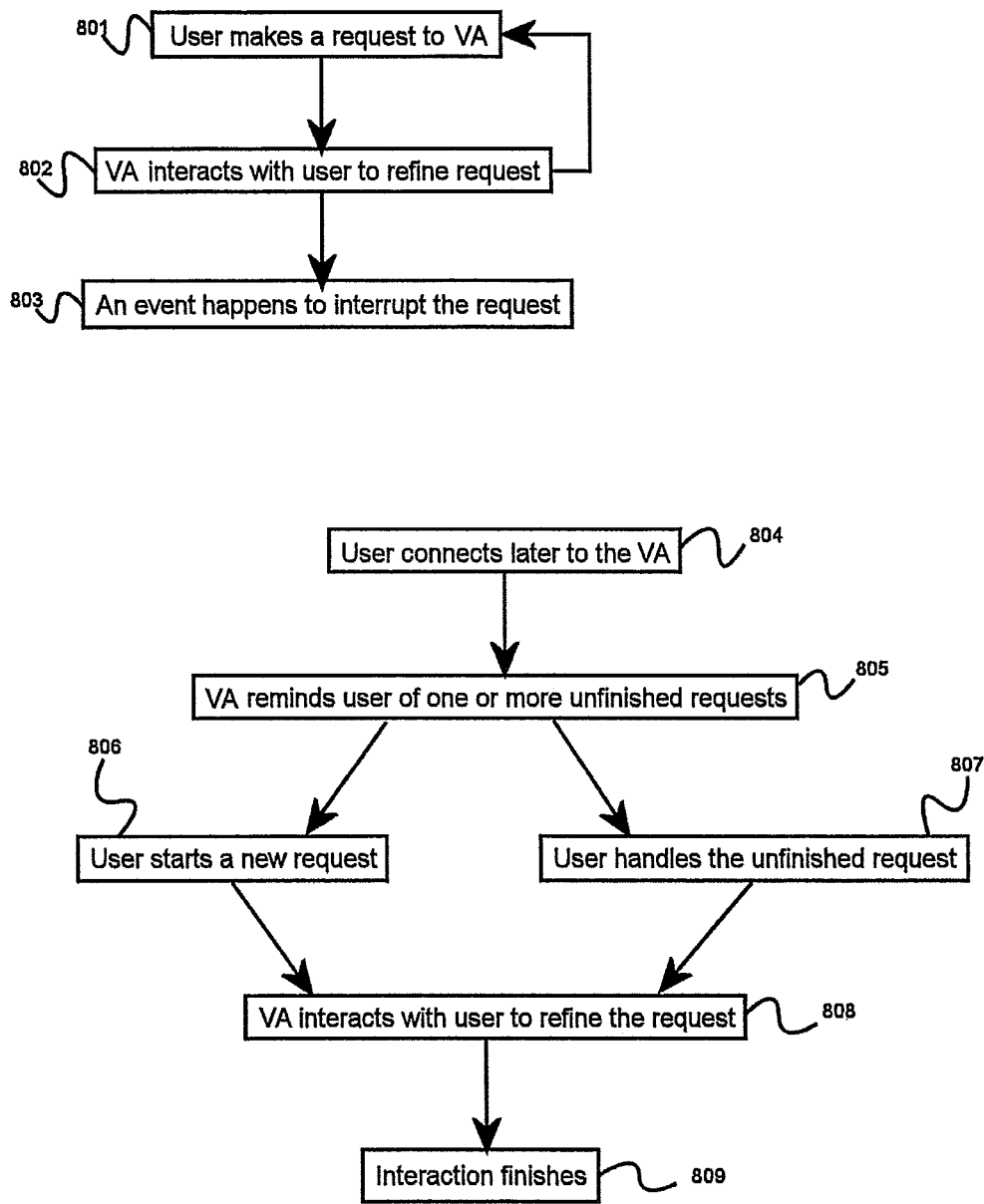
FIG. 8 is a high-level process flow diagram illustrating an exemplary method for persistence of a virtual assistant across multiple platforms in a social network of virtual assistants.

FIG. 8 is a high-level process flow diagram illustrating an exemplary method for persistence of a virtual assistant across multiple platforms in a social network of virtual assistants, according to an embodiment of the invention. In step 801, user 701 interacts with virtual assistant 710 using user device 702 (for example, a smart phone) to request, for example, to setup an invitation to a dinner party to other users. In step 802, user 701 interacts with virtual assistant 710 to refine the request from step 701. For example, virtual assistant 710 may ask who to invite, what location, etc. in step 803, a command to postpone the request is issued by user 701 and the request is interrupted (for example, user 701 utters the command, "let's finish this later").

A period of time passes (for example, several hours) and in step 804, user 701 connects to virtual assistant 710 via user device 703 (for example, a tablet device). In step 805, virtual assistant 710 identifies an unfinished task in task repository 711 and notifies user 701 that there is an unfinished task. For example, virtual assistant 710 utters, "at which location would you like your dinner party. User 701 may, in step 806, decide to not continue with the unfinished task and utter a new request to virtual assistant 710. Alternatively, user 701 may choose to continue the unfinished task in step 807. If so, virtual assistant 710 interacts with user 701 to discover the remaining details of the request (for example, location and time of dinner party, etc.). Virtual assistant 710 may connect to other PA 621, 622, CA 608, 609, 610, and or external services 630 to complete the request. When completed, the interaction between user 701 and virtual assistant 710 terminates in step 809.

Figure 9:
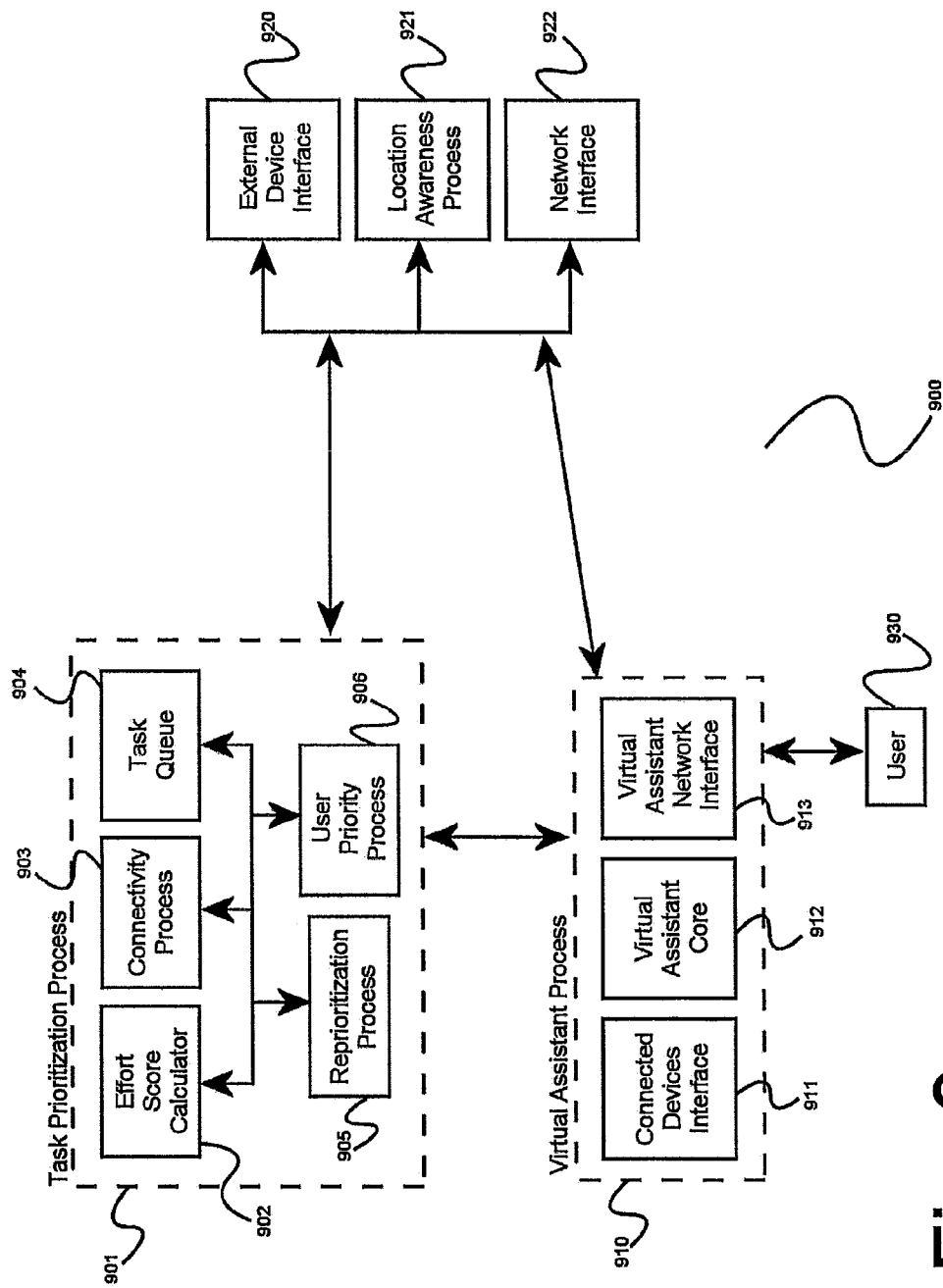
FIG. 9 is a block diagram illustrating an exemplary architecture of a system for automated adaptive prioritization of tasks in a virtual assistant environment.

FIG. 9 is a block diagram illustrating an exemplary architecture of a system for automated adaptive priority of tasks in a virtual assistant environment, according to an embodiment of the invention. According to the invention, key elements of virtual assistant task environment 900 typically comprise a task prioritization process 901, a virtual assistant process 910, external devices interface 920, location awareness process 921, and a network interface 923. Each of these may in turn be comprised of several components, in varying combinations, as will be described in detail herein.

User 930 interfaces to virtual assistant process 910 by means of voice, text, tactile, and/or video input, or a combination of one or more methods, or by some other means to request processing of one or more tasks (herein referred to as, "the task"). For example, a task to book a flight or a task to make dinner reservations. Virtual assistant core 912 understands the task (for example through the use of automatic speech recognition) and determines how best to process the steps to complete the task. In some embodiments, a task may require virtual assistant core 912 to interface to other virtual assistant 808 (for example, a virtual assistant that may be interfaced to expert system with specific or unique capability, such as a virtual assistant for a furniture company with special information on furniture sales information) via virtual assistant network interface 913 and/or external service 830 via external device interface 920 (for example, information from a device connected to the internet, such as a traffic camera) via connected devices interface 911 to process and complete the task. In some embodiments virtual assistant process 910 may not have a suitable connectivity to other elements required to complete the task. For example, in the case where information from an external service 830 via external device interface 920 is required, external service 830 may require internet connectivity to receive the information required to complete a task (for example, images from a traffic camera to determine traffic patterns along a planned route). In another embodiment, a connection to a virtual assistant on a social network of virtual assistants 801 via virtual assistant network interface may be required to complete a task. In the instances where connectivity is not available, virtual assistant core may add a task to task queue 904. In some embodiments, user 930 may indicate a priority for a task using a one or more interfaces to assign a priority (for example, user 930 is given a choice via a graphical user interface, or via voice command, to indicate low, medium or high priority). User priority process 906 associates a priority to a task record in task queue 904. Once a task is added task queue 904, effort score calculator 902 determines what may be required to complete the task. For example, one or more of the following attributes may be stored as parameters of a task to identify effort required to complete a task and assist in determining when and under what conditions tasks may be performed:

Amount of data that may be required to transmit, if any, for a task. For example, a time estimate on how long a task will take to complete may be calculated by a combination of the amount of data required to transmit and connection speed of network interface 923.

Communication mode required, if any, for a task. For example, a task may require a synchronous or asynchronous communication (or a combination of both) with external service 830 via connected devices interface 911.

Type of connectivity required. Network interface 923 may be a local area network (LAN) covering a small geographic area, such as a school or company; a wide area network (WAN) providing communication in a broad geographic area covering national and international locations; personal area networks (PAN) such as a wireless LAN with a very short range (up to, for example, a few meters), for example when communicating with external service 830 such as, a refrigerator or automobile enabled to provide relevant information about itself; internet connectivity for example, to connect to external service 830 via external device interface 920 that is also connected to the internet; intranet connectivity, for example, to connect to external service 830 via external device interface 920 that may provide corporate or retail information services; virtual private networking capability, for example to connect securely to external services 830, and the like.

Location and time awareness. For example, GPS coordinates, GSM localization, location proximity via Wi-Fi (or other wireless) services, and the like. It will be appreciated by one having ordinary skill in the art that any of the many class of computer program-level services used to provide specific controls for location and time data as control features in computer programs will be used to determine location and time.

Time zone of user 930 and/or time zone of required resources that may prevent or enable interface to said resource. For example, time zone of other virtual assistant 809, time zone of user 820 who may be the owner of other virtual assistant 809, time zone of external service 830, and the like.

In addition to the above attributes, connectivity process 903 determines a more detailed connectivity requirement for each task to more accurately assist in determining a priority for a task:

Type of connectivity required for a task. For example, connectivity to a local area network (LAN) covering a small geographic area, such as a school or company where the required service is located; a wide area network (WAN) providing communication in a broad geographic area covering national and international locations; personal area networks (PAN) such as a wireless LAN with a very short range (up to, for example, a few meters); internet connectivity, intranet connectivity, and the like. In some embodiments, one or more types of connectivity may be required Signal strength of the current LAN, WAN, PAN, or of internet connection. For example, connectivity process 903 may use signal strength to estimate an amount of time that connectivity may last. Weak signal strength may indicate that a connectivity source is far away and thus an assumption can be made that a connection may only last a few minutes or seconds.

Signal (for example, a mobile network signal) strength trend. That is, determining, using recent historical metrics, if the signal may be getting stronger or weaker.

Signal strength (for example, the magnitude of the electric field at a reference point corresponding to virtual assistant process 910 that is a significant distance from the transmitting apparatus) trend. For example, when user 930 is in motion, signal strength may be fluctuating. Using recent historical metrics, signal strength of the apparatus that may be providing connectivity to complete certain tasks for virtual assistant process 910 may be on a progression where strength is increasing or decreasing. Connectivity process 903 may determine that when an increasing signal strength trend is present, connectivity may last longer, whereas on a decreasing signal strength trend, connectivity may not, for example, last long. In some embodiments, signal strength trends may be used in conjunction with location information from location awareness process 921. For example, connectivity process 903 may cross-reference signal strength trend with proximity to, for example, a nearby city where the likelihood of a signal transmitting device is high. In this example, if the signal strength trend is intensifying coupled with location information that user 930 is approaching a large metropolitan area, connectivity process may determine that the likelihood of a long duration of connectivity may be probable. In this example, virtual assistant core 912 may be able to complete high-effort tasks, that is tasks that are deemed to require a larger than typical effort as determined by effort score calculator 902. For example, booking a flight with other virtual assistant 810 that may require a back and forth dialog with user 930. As such, reprioritization process 905 may reprioritize tasks in task queue 904 accordingly.

Connection type selection. Connectivity process 903, may determine that certain tasks may only be performed on certain types of connections. For example, if a task that may require a large transmittal of data which may, in some connectivity types cost more (for example, on a cellular network where user 930 is roaming), connectivity process 903 may require that a task only use, for example, a lower cost network, such as a Wi-Fi network.

Privacy of tasks. If a task has privacy requirements, connectivity process 903 may require that a certain type of connection be available on network interface 923. For example, a network capable of supporting a VPN connection.

In a particular embodiment, connectivity process 903 may predict when connectivity may be available next by using location information from location awareness process 921. For example, in the case where user 930 may be currently offline but requesting tasks from virtual assistant process 910 and may be in a state of motion (for example, user 930 may be on a train headed towards a metropolitan area), connectivity process 903, may use location information to determine the amount of time to be within range of known mobile of Wi-Fi networks, or some other form of connectivity, in order to start or continue processing tasks that may have been requested while user virtual assistant process 910 was not connected or continue processing a task that virtual assistant process 910 may have been processing previously and connection lost. In some embodiments, connectivity process 903 may assume that there will be connectivity available, given location information from location awareness process 921, even if it may not known for sure that connection may become available. In a particular embodiment, location awareness process 921 may use other information (for example, speed, direction, and the like) to estimate when connectivity on network interface 923 may be available. In some embodiments, virtual assistant process 910 may notify user 930 of a predicted time-to-connectivity (that is, how long it may be until virtual assistant process 910 may establish a connection to one or more networks required to complete tasks).

Once effort score calculator 902 has determined details and environment that may be required to perform and complete a task, effort score calculator 902 computes an effort score, for example, how long a task may take to complete, what type of connection is required, etc. Effort score calculator 902 may store an effort score for each task in task queue 904. In some embodiments, a duration required to complete a task may be stored for each task in task queue 904. In a particular embodiment, effort score calculator will may be required for a task where a priority was set by user 930 using user priority process 906.

Once a plurality of tasks are stored in task queue 904, reprioritization process 905 may determine that a reprioritization of tasks may be required. For example, if connectivity is intermittent through network interface 923 (for example, connectivity availability is unpredictable and may connect and disconnect at unpredictable periods), reprioritization process 905 may reprioritize tasks so that tasks with lowest effort scores may be attempted first. For example, a task where a length of time to complete is minimal and/or where minimum amounts of data transfer may be required may be prioritized.

In a particular embodiment, user priority process 906 may override reprioritization process 905 with an urgent task. For example, if user 930 requests virtual assistant process 910 to prioritize a task (herein, referred to "priority task") to completion before all other tasks, reprioritization process will keep priority task in the first position, that is, the current task to attempt to complete by virtual assistant process 910. In a particular embodiment, a priority task may be set to a high priority. In this case, user priority process may increase the priority of priority task so that it gets the majority of processing time, while still allowing reprioritization process to process other tasks based on attributes of all tasks in task queue 904 and current environment parameters (for example, time left until next connectivity with a long duration).

In a particular embodiment reprioritization process may prioritize tasks in task queue 904 based on connectivity speeds. For example, if there are tasks with low data requirements, said tasks would be prioritized before tasks that may require a large amount of data to be transferred.

In a preferred embodiment, when a task is not complete and network interface 923 loses connectivity to the required network, the task will be marked as incomplete in task queue 904. When connectivity is re-established on network interface 923, reprioritization process 905 may keep said task as top priority or in some situations, another task may take priority based on environmental parameters. For example, a connection where it is predicted that connectivity may not be active for the duration required for an unfinished task, a task with a low effort score may then be prioritized. The unfinished task may be attempted again when a suitable connection via network interface 923 is available.

In a particular embodiment, virtual assistant core 912 may provide a report to user 930 on the status of tasks in task queue 904. For example, a list may be presented with a list (for example via a graphical user interface such as a screen of a tablet device) of tasks that may have been completed, a percentage completion on tasks that may only be partially complete, and a list of tasks that where processing may not have been attempted.

In a another embodiment, virtual assistant core 912 may present estimations on when tasks can be completed and presented to user 930 (for example by uttering voice signifying as such).

In a preferred embodiment, reprioritization process 905 may be continuously adapting and reprioritizing tasks based on data available about tasks and the current environment (such as the status of connectivity. For example, using predictive elements such as when the next time network interface 923 will have a connection to a required network and types of connectivity available (for example, Wi-Fi, GSM, and the like).

Figure 10:
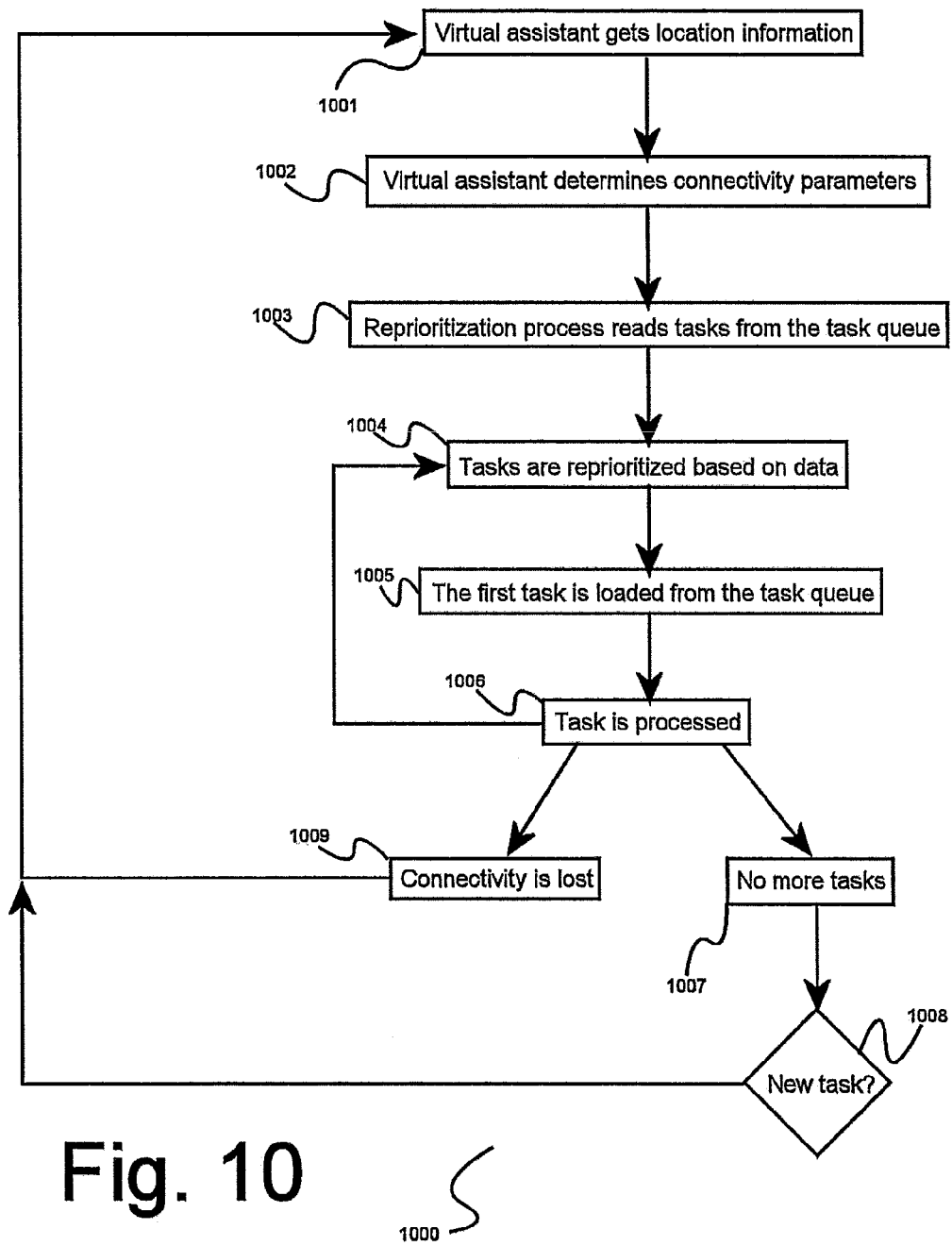
FIG. 10 is a high-level process flow diagram illustrating an exemplary method for automated adaptive prioritization of tasks in an intermittently connected virtual assistant environment.

FIG. 10 is a high-level process flow diagram illustrating an exemplary method for automated adaptive priority of tasks in an intermittently connected virtual assistant environment, according to an embodiment of the invention. In step 1001, virtual assistant core 912 gets the current location of user 930. For example, user 930 is travelling on a train in northern Europe and may be in close proximity to a small town. In step 1002, virtual assistant core 912 determines that within an estimated amount of time, virtual assistant process 910 may establish connectivity via a cellular telephone site that is Internet capable. For example, given the speed of the train and the direction in which it is heading, it is determined that connectivity may last four minutes. In step 1003, reprioritization process 905 reads tasks from task queue 904 including associated information (for example task effort score as determined by effort score calculator 902, time required to process task, etc.), reprioritization process 905 then rearranges tasks in task queue 904 to add a higher priority to tasks that take less than four minutes to process while taking into account any prioritizations set by user 930 via user priority process 906. As such, tasks are reprioritized in an order where the priority is tasks that may require four minutes or less to process. In step 1004, the first task is loaded and processed in step 1005. For example, a task may require an interface to another virtual assistant 809 via network interface 913 or receive data via connected devices interface 911. Once the task processing is complete, control returns to step 1003 and tasks are reprioritized again based on remaining tasks in task queue 904 and environment parameters. For example, given the time to process the previous task and the estimated time until connectivity is lost (for example, through updated location from location awareness process 921, connectivity trends, that is, signal strength may be getting stronger or weaker as determined by connectivity process 903 and other parameters) and the time duration of remaining tasks in task queue 904. Once tasks in task queue 904 are reprioritized by reprioritization process 905, the process continues in a similar fashion through steps 1004 to 1006 as above until all tasks have been successfully completed in step 1006, or when connectivity is lost in step 1005. If there are no more tasks, the process will restart at step 1001 when a new task is added. If connectivity is lost, virtual assistant core 912 will check the status of the current task, if it did not complete successfully due to lost connectivity from network interface 923, then the task will be marked as incomplete in task queue 904. Information so that the task can continue to be processed is stored. The process will continue at step 1001 and continue in a similar fashion as outlined above.

Figure 11:
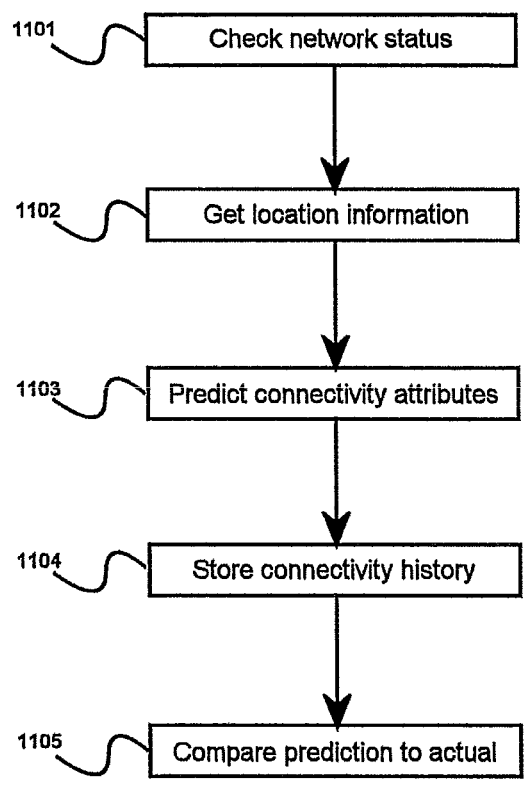
FIG. 11 is a high-level process flow diagram illustrating an exemplary method for predictive network connectivity in an intermittently connected virtual assistant environment.

FIG. 11 is a high-level process flow diagram illustrating an exemplary method for predictive network connectivity in an intermittently connected virtual assistant environment, according to an embodiment of the invention. In step 1101, virtual assistant process 910 checks network interface 923 for an active connection to a required network to complete a task. In step 1102, virtual assistant process 910 reads location information from location awareness process 921. In this example, user 930 may be travelling in an automobile with intermittent connectivity. If an active connection to a network via network interface 923 is present, then connectivity process 903 may predict how long the connection will remain active on network interface 923, for example by analyzing the recent historical trend of the signal strength or by determining a proximity to known connection apparatuses (for example a metropolitan area network). By using location information obtained in step 1102, virtual assistant core 912 may determine that user 930 may be headed away from the area where connectivity was established. Using, for example, speed of travel, signal strength progression (that is, signal strength may be getting weaker), connectivity process 903 may determine, in step 1103, an estimated time until connectivity may no longer available. Using one or more of these attributes (or other information available to task process 901), reprioritization process 905 may use the time left with an active connection on network interface 923 to reprioritize tasks in task queue 904 in order to complete tasks that can be completed within the remaining time left until a disconnect (which may be a theoretical amount of time predicted until a connection will be lost). In some embodiments, reprioritization process 905 may decide to complete high priority tasks even if said tasks may take longer than a predicted amount of time of a duration when connectivity may remain active. In step 1104 connectivity history (that is, duration of active connectivity, signal strength, location, etc.) is recorded in usage database 813 via usage process 812 (in some cases, usage database 813 may be a local database on the same device as virtual assistant process 910, for example, a mobile phone, a tablet, or an embedded device such as a virtual assistant equipped automobile, etc. so that connectivity behavior can be understood and referenced for future tasks in the same location. After connection is lost by network interface 923, step 1105 compares the predicted time until connectivity was predicted to be lost to when connectivity was actually lost. As such, prediction algorithms are updated as necessary with any discrepancies from predicted durations and actual durations. In a particular embodiment, historical data will be looked up as needed to predict connectivity attributes for said location for future task by task process 901.

Referring back to step 1101, if it is determined that there is no connectivity on network interface 923, using location data obtained in step 1102, connectivity process 903 may calculate, in step 1103, a predicted time to when network interface 923 may have connectivity. In this example, reprioritization process 905 may reprioritize tasks in task queue 904 based on the predicted connectivity attributes (for example, connectivity process 903 may have predicted that network interface 923 may have connection in five minutes and based on location information from location awareness process 921, connection will stay active for only several minutes. In this example, reprioritization process 905 may reprioritize tasks in task queue 904 as more information becomes available. In step 1104, connectivity predictions are stored in usage database 813 via usage process 812. In a particular embodiment, usage database 813 may reside on a laptop that may also be executing a virtual assistant process 910 or some other portable device). Once connectivity is established on network interface 923, step 1105 compares predictions made in step 1103 to actual data of when connectivity was established, duration of connectivity and any other predictions that were made by connection process 903. As such, prediction algorithms are updated as necessary. In a particular embodiment, historical data will be looked up as needed and used to predict connectivity attributes for said location for future task processing requirements by task process 901.

Figure 15:
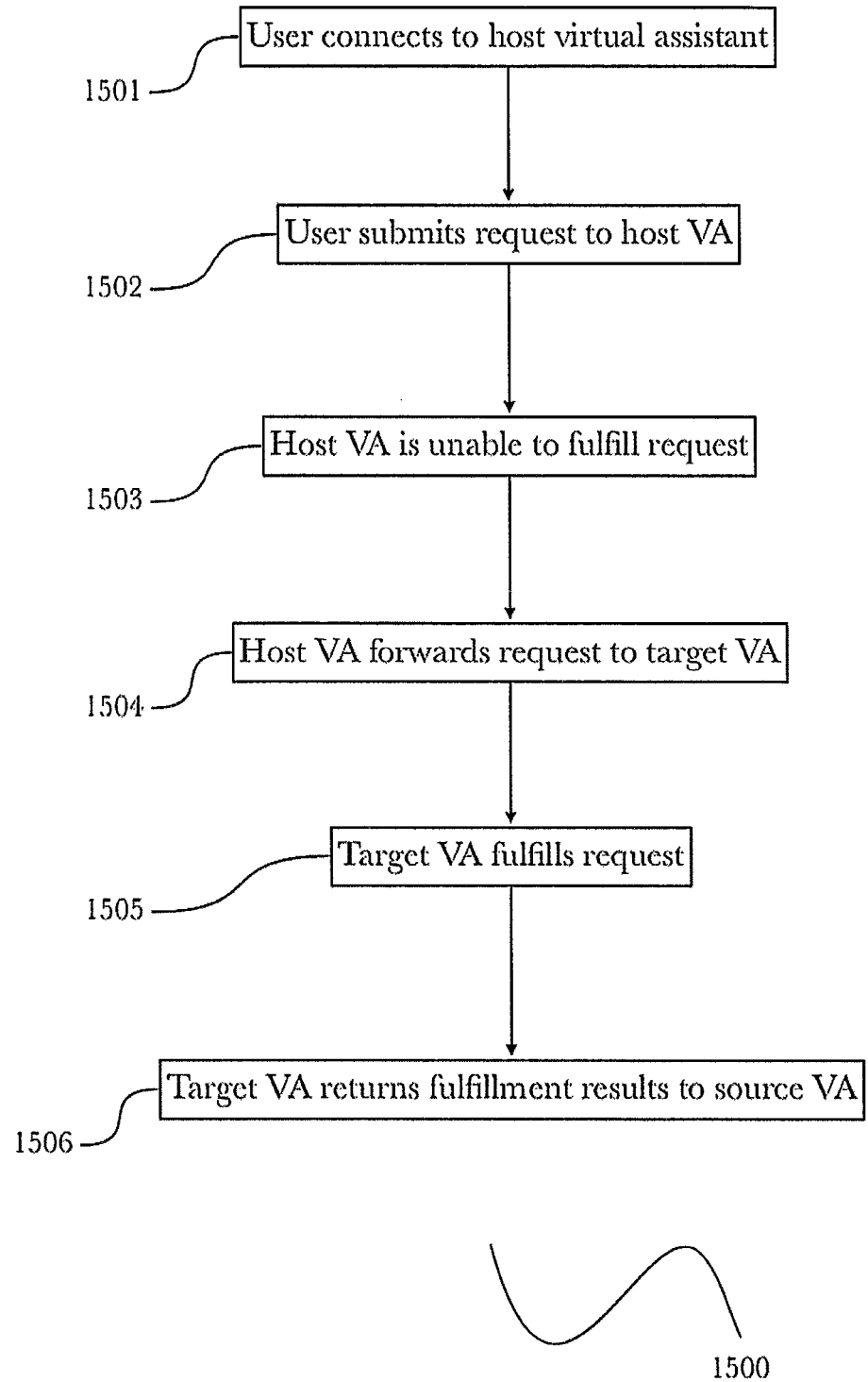
FIG. 15 is a method flow diagram illustrating an overview method of networked virtual assistant operation, according to a preferred embodiment of the invention.

FIG. 15 is a method flow diagram illustrating an overview method 1500 of networked virtual assistant operation, according to a preferred embodiment of the invention. As illustrated, in an initial step 1501 a user may connect to a virtual assistant by any appropriate means (such as by calling a special dialing number for an assistant service, or using a virtual assistant software application on a smartphone or other computing device). In a next step 1502, the user may submit a query or request, such as a request for information, to the virtual assistant. Ordinarily, the virtual assistant would process and fulfill the request, returning the results to the user (as is common in the art). According to the invention, in a next step 1503 the virtual assistant may determine that it is unable to fulfill the request on its own (or perhaps is unable to fulfill it to a satisfactory degree), and may then decide to forward the request to another virtual assistant in a next step 1504. The second, or "target", virtual assistant may then fulfill the request in step 1505, as if it had originated from a user (that is, no special operation may be required for fulfillment, and operation on the part of the target VA should be similar regardless of the request's origin). In a final step 1506, the results of the request fulfillment may then be sent back to the host VA for presentation to the user. In this manner it can be appreciated that form the user's perspective, they only interacted with the host VA and may not be aware that networked operation is occurring, only that their request was fulfilled. This can be appreciated to facilitate improved assistance operations through the use of inter-VA communication within a network, without impacting user experience or detracting from overall performance.

Figure 16:
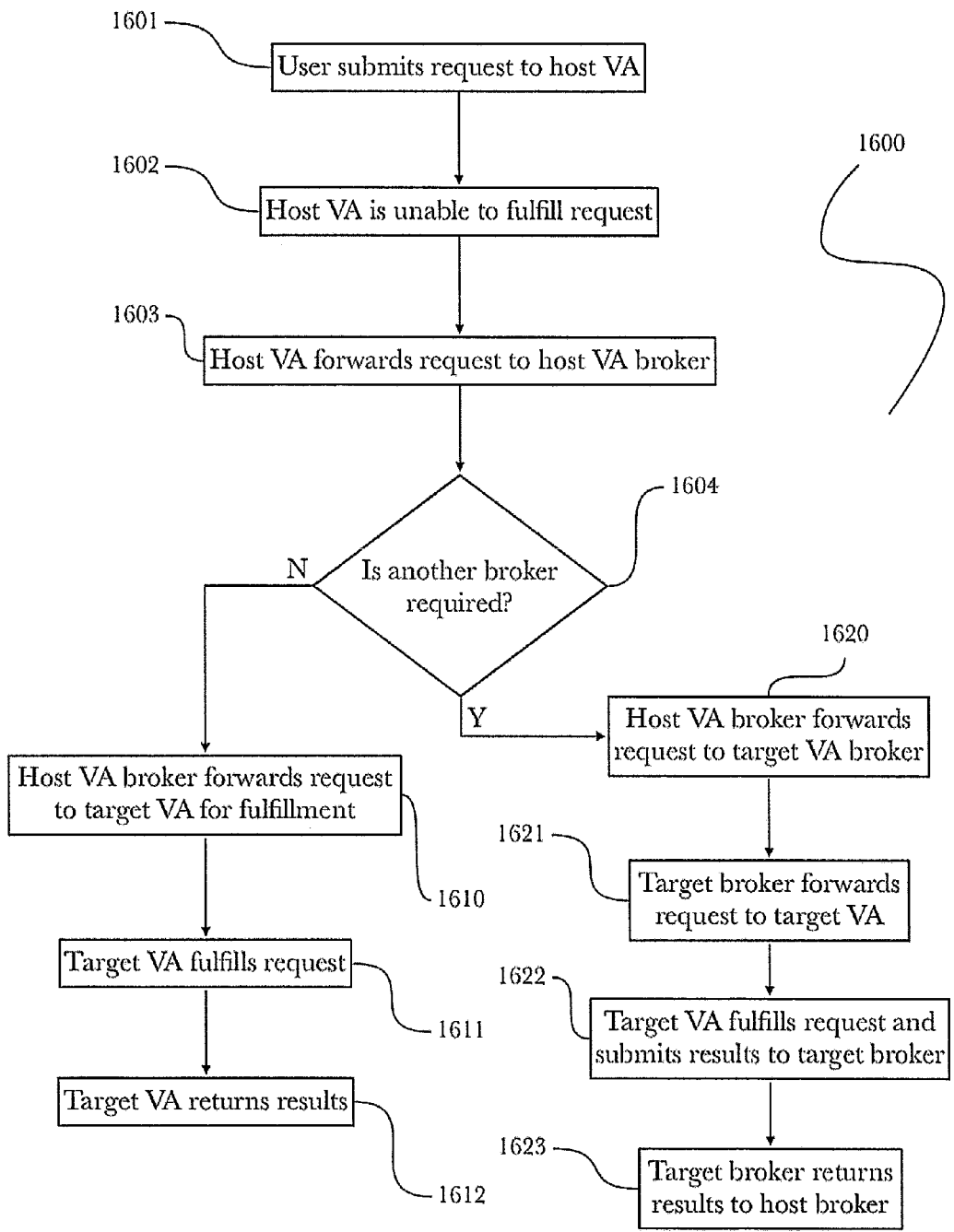
FIG. 16 is a method flow diagram illustrating a method for networked virtual assistant operation utilizing brokers.

FIG. 16 is a method flow diagram illustrating a method 1600 for networked virtual assistant operation utilizing brokers. According to the embodiment, networked virtual assistant operations may be carried out between multiple VAs using a VA broker as an intermediary (such as to maintain a knowledge base pertaining to individual VA suitability for various requests, such as their individual capabilities or access to knowledge bases relevant to specific requests), or between multiple VA brokers (such as to facilitate communication across VA networks as needed, or to use another broker's knowledge base for improved routing to a VA within a network), as needed in addition to the previously described (referring to FIG. 15, above) operation between individual virtual assistants directly. In an initial step 1601, a user may submit a request to a host VA, as previously described. According to the brokered operation described presently, in a next step 1602 the host VA may determine that it is unable to fulfill the request adequately, and may send the request to a VA broker in a next step 1603 for help with finding suitable target VAs. The VA broker may then decide how to proceed in a next step 1604, optionally directly returning suitable target VAs in a list to the host VA (in a first branching step 1610), or to forward the request to another VA broker (in a second branching step 1620). If the VA broker returned suitable targets VAs directly to the host VA (1611), the host VA evaluates the results and decides whether to initiate communication with any of the target VAs (as described in FIG. 15). In step 1611 the target VA fulfills the request and in step 1612 it send the results back to the host VA for presentation (in a manner controlled by the host VA) to the user that originated the request. If the request instead was forwarded to another VA broker, as might be needed to identify suitable target VAs within a separate network (i.e., a VA not serviced by the host VA broker), the target VA broker may then identify suitable target VAs in step 1621, at which point a target VA fulfills the request and submits results in step 1622 to the target broker, which then sends the results to the host broker in step 1623, thus returning information about these results to the host VA either directly or indirectly. The host VA then decided how to proceed with the suggestions (if any were found). It should be appreciated that it is also possible for the target VA broker to then determine that another VA broker is needed for optimal fulfillment, continuing to route the request to another target VA broker as needed, and that only a single broker-to-broker interaction is illustrated for brevity. It will be appreciated by one having ordinary skill in the art that other modes of communication and control are possible. For example, while normally a host VA is in control throughout the process, selecting a target VA from a list provided by a VA broker, controlling the user dialog, and determining precisely how a response received from another VA (i.e., a target VA) is actually presented to the user, and so forth. Alternatively, a VA broker may send to the host VA, instead of a list of target VAs, a list of responses received from a plurality of target VAs, and the host VA can then select the response it prefers. Or, the VA broker can evaluate a set of responses to a request that is received from a plurality of target VAs, and the VA broker makes the selection of the best response, then sending only the selected response to the host VA. Many variations are possible, as should be evident.

Figure 17:
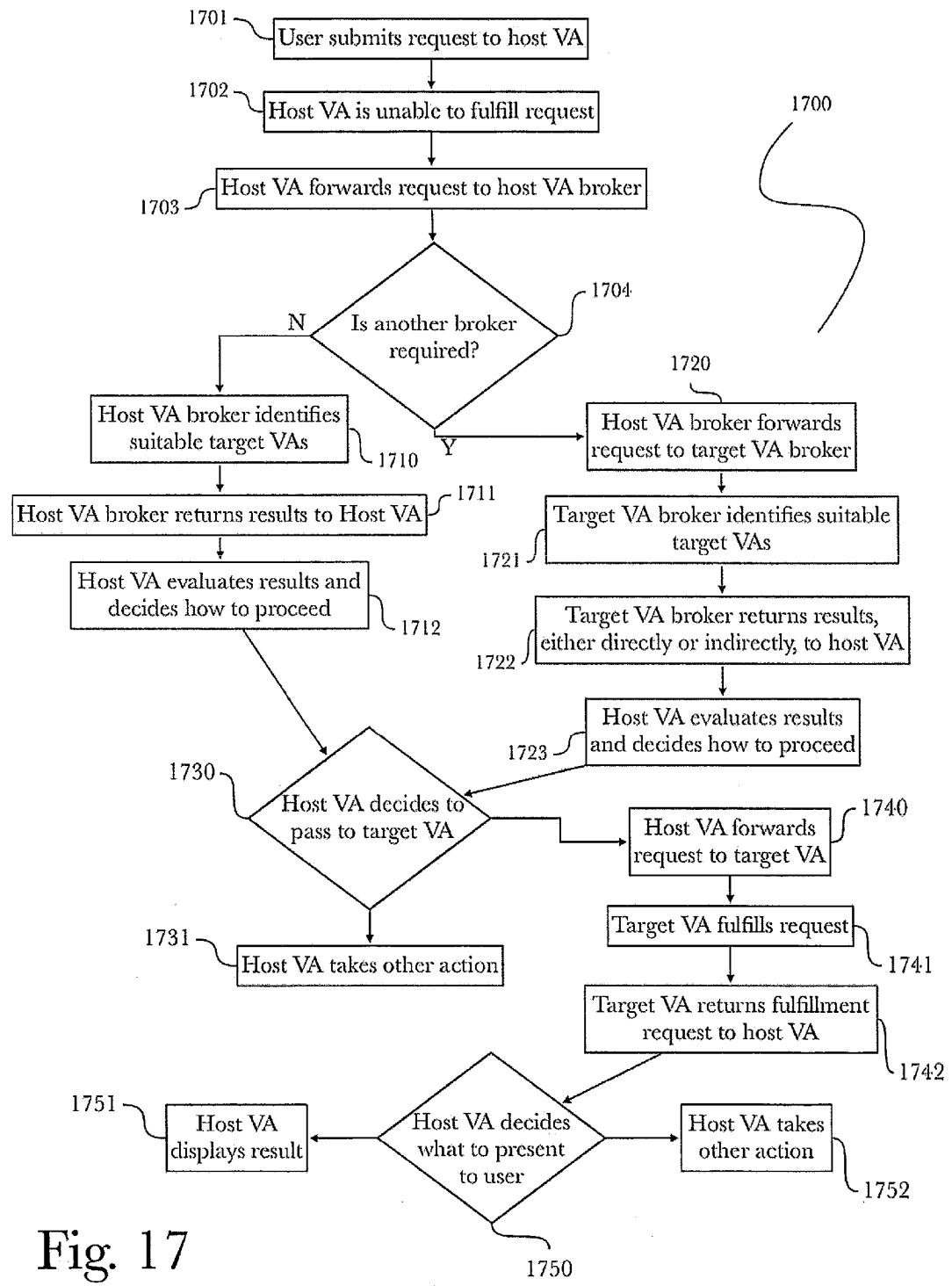
FIG. 17 is a method flow diagram illustrating a further method for networked virtual assistant operation utilizing brokers.

FIG. 17 is a method flow diagram illustrating a further method 1700, according to a preferred embodiment of the invention, for networked virtual assistant operation utilizing brokers. According to the embodiment, networked virtual assistant operations may be carried out between multiple VAs using a VA broker as an intermediary (such as to maintain a knowledge base pertaining to individual VA suitability for various requests, such as their individual capabilities or access to knowledge bases relevant to specific requests), or between multiple VA brokers (such as to facilitate communication across VA networks as needed, or to use another broker's knowledge base for improved routing to a VA within a network), as needed in addition to the previously described (referring to FIG. 15, above) operation between individual virtual assistants directly. In an initial step 1701, a user may submit a request to a host VA, as previously described. According to the brokered operation described presently, in a next step 1702 the host VA may determine that it is unable to fulfill the request adequately, and may send the request to a VA broker in a next step 1703 for help with finding suitable target VAs. The VA broker may then decide how to proceed in a next step 1704, optionally generating a list of suitable target VAs in a list (in a first branching step 1710), or forwarding the request to another (target) VA broker (in a second branching step 1720). If the host VA broker identified a list of suitable target VAs in step 1710, then in step 1711 the host VA broker returns those results (i.e., the list of target VAs) directly to the host VA, whereupon the host VA evaluates the results in step 1712 and decides whether to initiate communication with any of the target VAs (as described in FIG. 15). If it decides not to do so, then in step 1751 the host VA takes some other action, such as for example telling the user it cannot fulfill the request, or asking the user to provide more information. Otherwise, in step 1740 the host VA forward the request to a selected target VA, whereupon in step 1741 the target VA fulfills the request, returning the fulfilled request to the host VA in step 1742. Thereupon, the host VA in step 1750 decides how to present the information provided in the response to the user, and in step 1751 displays the results to the user. Also, in some cases after step 1750 the host VA may also take other actions in step 1752, such as initiating a new dialog turn with the user. If execution moved in step 1704 to step 1720, then in step 1721 the target VA broker identifies one or more suitable target VAs. Of course, it is possible that a first target broker would fail to identify any suitable VAs, at which point operation could loop back to step 1720 with a new target VA broker, until there are no more available target VA brokers to send the request to (at which point execution would jump to step 1731 for some sort of error handling, since there would be no target VA anywhere available to satisfy the request sent in step 1701). Once suitable target VAs are identified in step 1721, in step 1722 the target VA broker returns the results (i.e., a list of suitable target VAs) to the host VA (either directly, or indirectly via the host VA broker and possibly one or more other target VA brokers). As in step 1712, in step 1723 the host VA evaluates the results and decides how to proceed abd execution continues in step 1730 as described above.

It will be appreciated by one having ordinary skill in the art that other modes of communication and control are possible. For example, while normally a host VA is in control throughout the process, selecting a target VA from a list provided by a VA broker, controlling the user dialog, and determining precisely how a response received from another VA (i.e., a target VA) is actually presented to the user, and so forth. Alternatively, a VA broker may send to the host VA, instead of a list of target VAs, a list of responses received from a plurality of target VAs, and the host VA can then select the response it prefers. Or, the VA broker can evaluate a set of responses to a request that is received from a plurality of target VAs, and the VA broker makes the selection of the best response, then sending only the selected response to the host VA. Many variations are possible, as should be evident.

It should also be apparent that, among other things, a plurality of virtual assistant networks operating as described herein may in effect provide a "network of knowledge", wherein a user can interact with a host VA by querying it for information, and the host VA can access a potentially very extensive network of VAs, each of which possesses at least a knowledge base, thereby making the entire network of knowledge bases accessible in a natural way to a user via a single virtual assistant user interface.

The skilled person will be aware of a range of possible modifications of the various embodiments described above. Accordingly, the present invention is defined by the claims and their equivalents.

What is claimed is:

1. A system for operating a network dialog-based virtual assistants, comprising:
    a plurality of dialog-based virtual assistants each comprising programmable instructions stored and operating on a network-connected computing device comprising a memory and a processor and adapted to interact with users using conversational request and response dialog flows; and
    a plurality of virtual assistant brokers each comprising programmable instructions stored and operating on a network-connected computing device comprising a memory and a processor;
    wherein a first dialog-based virtual assistant receives a natural-language dialog request from a user via a communications network;
    wherein the first dialog-based virtual assistant interprets the natural-language dialog request, determines that it cannot fulfill the natural-language dialog request, and forwards the natural language dialog request to a first virtual assistant broker;
    wherein the first virtual assistant broker identifies a plurality of second dialog-based virtual assistants that may be capable of fulfilling the natural language dialog request;
    wherein the first virtual assistant broker sends a list of the plurality of second dialog-based virtual assistants to the first dialog-based virtual assistant;
    wherein the first dialog-based virtual assistant selects a third dialog-based virtual assistant from among the plurality of second dialog-based virtual assistants and forwards the natural language dialog request to the third dialog-based virtual assistant;
    wherein the first dialog-based virtual assistant receives a natural language dialog response from the third dialog-based virtual assistant; and
    wherein the first dialog-based virtual assistant presents the natural language dialog response in a suitable format to the user.

2. The system of claim 1, wherein communications between dialog-based virtual assistants and virtual assistant brokers is carried out using a virtual assistant markup language, wherein the virtual assistant markup language allows for standardized communication between the dialog-based virtual assistants, between dialog-based virtual assistants and virtual assistant brokers, and between the virtual assistant brokers.

3. The system of claim 1, further wherein the first dialog-based virtual assistant forwards the natural language dialog request directly to the third dialog-based virtual assistant based on information received in a prior interaction from the first virtual assistant broker.

4. The system of claim 1, further wherein the first virtual assistant broker forwards the natural language request to a second virtual assistant broker.

5. A method for operating a network of dialog-based virtual assistants, comprising the steps of:
    receiving a natural language dialog request, at a first dialog-based virtual assistant comprising programmable instruction stored and operating on a computing device comprising a memory and a processor and adapted to interact with users using conversational request and response dialog flows, from a user;
    determining that the first dialog-based virtual assistant cannot fulfill the natural language dialog request;
    forwarding the natural language dialog request to a first virtual assistant broker comprising programmable instructions stored and operating on a computing device comprising a memory and a processor;
    identifying, by the first virtual assistant broker, a plurality of second dialog-based virtual assistants that may be capable of fulfilling the natural language dialog request;
    sending a list of the plurality of second dialog-based virtual assistants from the first virtual assistant broker to the first dialog-based virtual assistant;
    selecting a third dialog-based virtual assistant from among the plurality of second dialog-based virtual assistants;
    forwarding the natural language dialog request from the first dialog-based virtual assistant to the third dialog-based virtual assistant;
    receiving a natural language dialog response from the third dialog-based virtual assistant; and
    presenting the response in a suitable format to the user.

6. The method of claim 5, further comprising the step of forwarding the natural language dialog request to a second virtual assistant broker.

* * * * *